(12) United States Patent
Bilanin et al.

(10) Patent No.: US 9,734,924 B2
(45) Date of Patent: Aug. 15, 2017

(54) METHOD AND APPARATUS FOR SUPPRESSING FLOW-INDUCED JET PUMP VIBRATION IN A BOILING WATER REACTOR

(71) Applicant: CONTINUUM DYNAMICS, INC., Ewing, NJ (US)

(72) Inventors: Alan J. Bilanin, Princeton, NJ (US); Andrew E. Kaufman, New Hope, PA (US); Marc Sibilia, Princeton Jct., NJ (US)

(73) Assignee: CONTINUUM DYNAMICS, INC., Ewing, NJ (US)

( * ) Notice: Subject to any disclaimer, the term of this patent is extended or adjusted under 35 U.S.C. 154(b) by 391 days.

(21) Appl. No.: 14/223,855

(22) Filed: Mar. 24, 2014

(65) Prior Publication Data
US 2016/0358678 A1 Dec. 8, 2016
US 2017/0098481 A9 Apr. 6, 2017

Related U.S. Application Data

(60) Provisional application No. 61/852,834, filed on Mar. 22, 2013, provisional application No. 61/853,608, filed on Apr. 9, 2013.

(51) Int. Cl.
*G21C 15/25* (2006.01)
*G21C 13/032* (2006.01)
(Continued)

(52) U.S. Cl.
CPC ........... *G21C 13/032* (2013.01); *G21C 15/25* (2013.01); *G21C 17/001* (2013.01);
(Continued)

(58) Field of Classification Search
CPC ...................................................... G21C 15/25
(Continued)

(56) References Cited

U.S. PATENT DOCUMENTS

| 3,378,456 A | 4/1968 | Roberts |
| 4,285,770 A * | 8/1981 | Chi ........................ G21C 15/25 376/407 |

(Continued)

OTHER PUBLICATIONS

J.F Schardt, "Flow-Induced Vibration for Light-Water Reactors," General Electric Co. GEAP-24248 (DOE/N/4175-14), Mar. 1980, pp. 2.3-10 to 2.3-11.
(Continued)

*Primary Examiner* — Jack W Keith
*Assistant Examiner* — Daniel Wasil
(74) *Attorney, Agent, or Firm* — David M. Quinlan, P.C.

(57) ABSTRACT

Flow induced vibration (FIV) at the slip joint between a nuclear reactor jet pump mixer and diffuser is suppressed without installing additional parts or altering the jet pump construction. The disclosed method determines a relationship between reactor operating conditions that trigger FIV and the magnitude of a mixer/diffuser transverse contact load. A mathematical analysis on a representative jet pump configuration determines the quantitative relationship between mixer/diffuser cold positions and their positions when the reactor is operating. Thus, a prediction can be made as to whether an installed jet pump will experience FIV, and the mixer and diffuser can be positioned by a mixer adjustment tool when the reactor is cold to provide the necessary operational transverse contact load. Alternatively, a contact load measuring tool directly measures the magnitude and direction of the cold mixer/diffuser transverse contact load to determine if FIV will be suppressed when the reactor is operating.

18 Claims, 13 Drawing Sheets

(51) Int. Cl.
*G21C 17/017* (2006.01)
*G21C 17/00* (2006.01)

(52) U.S. Cl.
CPC ........ *G21C 17/017* (2013.01); *G21Y 2002/20* (2013.01); *G21Y 2004/301* (2013.01); *G21Y 2004/403* (2013.01)

(58) Field of Classification Search
USPC .................................................. 376/372, 260
See application file for complete search history.

(56) References Cited

U.S. PATENT DOCUMENTS

| | | | |
|---|---|---|---|
| 4,499,691 A | 2/1985 | Karazim et al. | |
| 4,847,043 A | 7/1989 | Gluntz | |
| 6,053,652 A | 4/2000 | Deaver et al. | |
| 6,394,765 B1 | 5/2002 | Erbes et al. | |
| 6,434,208 B1 | 8/2002 | Erbes et al. | |
| 6,435,839 B1 | 8/2002 | Erbes | |
| 6,438,192 B1 | 8/2002 | Erbes et al. | |
| 6,450,774 B1* | 9/2002 | Erbes | F04F 5/44 403/11 |
| 6,490,331 B2 | 12/2002 | Erbes | |
| 6,526,114 B2 | 2/2003 | Paillaman et al. | |
| 6,622,941 B2 | 9/2003 | Ganoza et al. | |
| 6,625,244 B2 | 9/2003 | Paillaman et al. | |
| 6,788,756 B2 | 9/2004 | Erbes | |
| 6,865,243 B2 | 3/2005 | Paillaman et al. | |
| 7,515,673 B2 | 4/2009 | Jensen et al. | |
| 7,578,191 B2 | 8/2009 | Kasik et al. | |
| 7,764,760 B2 | 7/2010 | Francisco | |
| 7,896,302 B2 | 3/2011 | Parker et al. | |
| 8,077,823 B2 | 12/2011 | Baversten et al. | |
| 8,170,174 B1 | 5/2012 | Lentner et al. | |
| 8,197,225 B2 | 6/2012 | Bass | |
| 2008/0029969 A1 | 2/2008 | Torres | |
| 2008/0031741 A1 | 2/2008 | Torres | |
| 2012/0219103 A1* | 8/2012 | Lynch | G21C 15/25 376/372 |
| 2013/0121451 A1* | 5/2013 | Hiratsuka | G21C 15/25 376/249 |

OTHER PUBLICATIONS

LaCroix, L.V., "Flow-Induced Vibration Characteristics of the BWR/5-201 Jet Pump," General Electric Co. GEAP-22211 (DOE No. AC02-77ET34209), Sep. 1982, pp. 4-3 to 4-4.

* cited by examiner

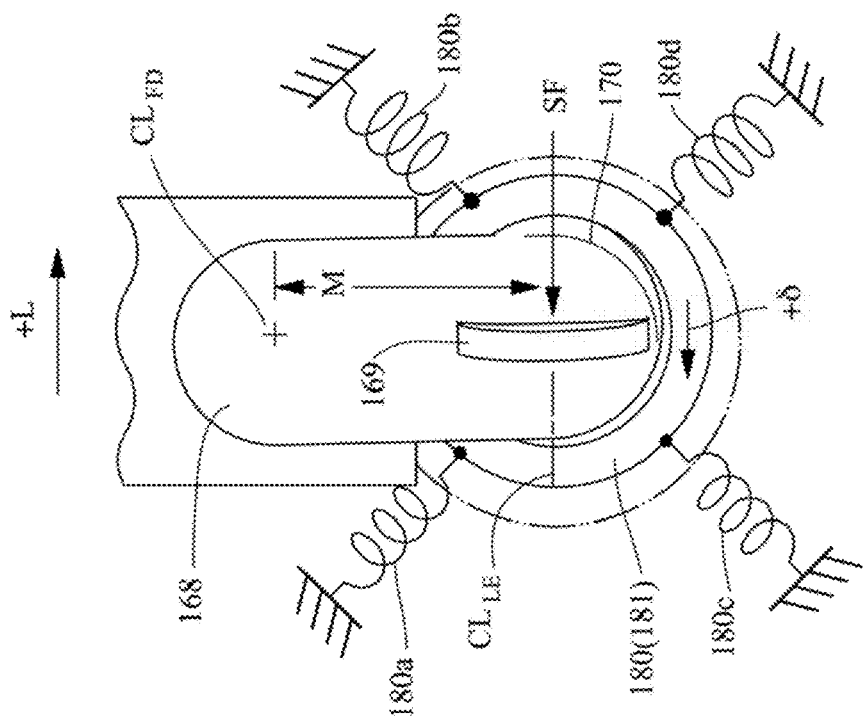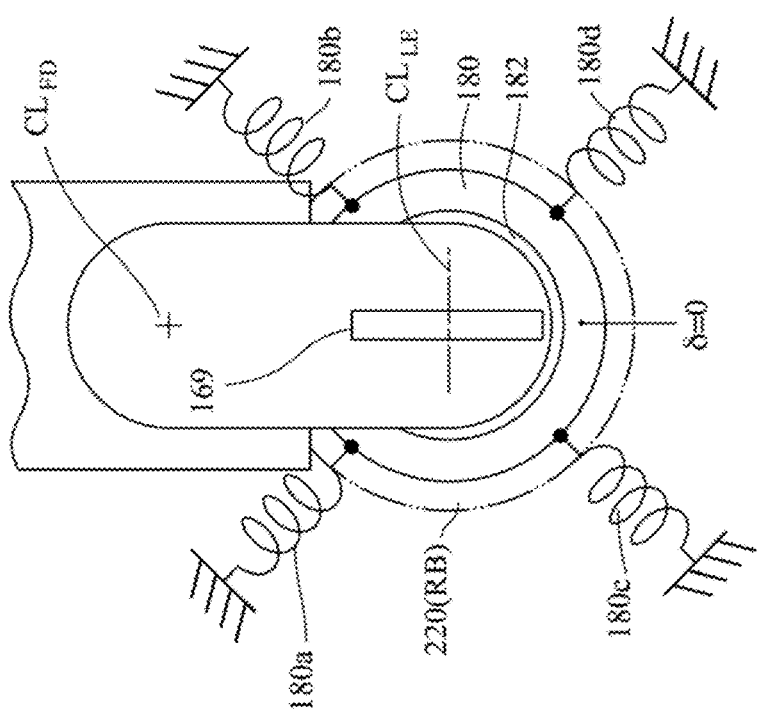

METHOD AND APPARATUS FOR SUPPRESSING FLOW-INDUCED JET PUMP VIBRATION IN A BOILING WATER REACTOR

CROSS-REFERENCE TO RELATED APPLICATIONS

This application claims the benefit of U.S. provisional applications No. 61/852,834, filed Mar. 22, 2013, and No. 61/853,608, filed Apr. 9, 2013, the contents of both of which are incorporated herein by reference.

BACKGROUND OF THE INVENTION

Field of the Invention

The present invention relates to suppressing flow-induced vibration (FIV) in a boiling water reactor (BWR) jet pump, and more particularly, to methods and apparatus for determining if a BWR jet pump is susceptible to FIV, and methods and apparatus for suppressing same.

Description of Related Art

The methods and apparatus described herein in connection with the present inventions are particularly adapted for a widely used boiling water reactor design of General Electric Co. FIG. 1 is a cut-away isometric depiction of a typical such conventional BWR taken from GE U.S. Pat. No. 6,434,208. Although FIG. 1 is highly schematic, it is nevertheless sufficient to afford an understanding of the construction and application of the inventive methods and apparatus described and claimed herein. Those skilled in the art will understand, however, that these methods and apparatus are not limited to use with or in connection with any particular reactor design.

A conventional BWR such as that shown in FIG. 1 includes a reactor pressure vessel (RPV) 10 supported by a foundation 12. The RPV 10 has a cylindrical side wall 14 and an integral bottom head 16. The side wall 14 terminates at its top end in a mounting flange 18 to which is secured a flange 20 of an RPV top head 22. The flanges 18 and 20 are secured by bolts (not shown) spaced around their circumference. This permits removal of the top head 22 for accessing the interior of the RPV, such as during shutdowns for maintenance or refueling.

A reactor core 24 inside the RPV 10 comprises fuel bundles 26 (some of which are omitted for clarity) of fissionable material. The amount of nuclear fission, and thus the amount of heat generated by the reactor core, is determined by the vertical positions of control rods 28, which are adjusted by control rod drives 30 external to the RPV 10. The core is immersed in water contained in the RPV, and nuclear fission of the material in the fuel bundles 26 produces sufficient heat to convert the liquid water into steam. Steam separators 32 extract water from the steam, and this water is taken from the RPV 10 at ports 34 (only one of which is shown) and led to recirculation pumps (not shown). The steam then passes through a steam dryer 36 to remove any residual water, which is taken from the RPV 10 at ports 38 (only two of which are shown).

The recirculation pumps return water to the RPV 10 via jet pumps, described in more detail below, inside the RPV 10. A core shroud 50 disposed coaxially with the RPV side wall 14 forms an annular region 52 in which a plurality of jet pump assemblies JPA (only one being shown in FIG. 1) are arrayed circumferentially around the core shroud 50 within the annular region 52. Typically, there are ten jet pump assemblies each having two jet pumps, as described in more detail below in connection with FIG. 2. The jet pumps have outlets that mate with jet pump exit openings 54 in a jet pump baffle plate 56 secured to the core shroud 50. In a conventional manner, the jet pumps take recirculated water from the recirculation pumps, entrain water from within the annular region as discussed below, and direct the output through the openings 54 for circulation upward through the reactor core 24 to be converted to steam as discussed above.

FIG. 2 is an isometric view of a typical jet pump assembly JPA used in the BWR shown in FIG. 1. The depiction in FIG. 2 (taken from GE Pub. No. US 2012/0219103) is also schematic, but includes sufficient detail for purposes of the present description. One main component of the jet pump assembly is a riser pipe 60 that has a riser inlet elbow 62 providing an inlet 64 to which water from the recirculation pumps is introduced. Typically, there are two recirculation pumps, and half of the riser inlets 64 are attached to a manifold that receives recirculated water from one of them, and the other half of the inlets are attached to a second manifold that receives recirculated water from the other one, although other numbers and arrangements of manifolds and recirculation pumps may be used in different reactor constructions. The riser pipe 60 extends upward from the inlet elbow 62 to a transition piece 66. The riser pipe is secured in place in the annular region 52 of the RPV 10 by welding the inlet elbow 64 to a water inlet nozzle (not shown) at the RPV side wall 14 and to a riser brace (not shown in FIG. 2) secured to the interior of the RPV side wall at a location proximate to the transition piece 66. (The riser brace is depicted schematically in FIG. 5.) Each jet pump assembly includes two essentially identical jet pumps JP.

FIGS. 2 and 3 taken together show constructional details of the jet pumps JP. FIG. 3 is an enlarged view of the region at the top of the jet pump assembly JPA and illustrates details of a transition assembly TA that distributes flow from the riser pipe 60 to the jet pumps JP. The transition assembly TA includes the transition piece 66, which divides the recirculating water in the riser pipe and introduces equal amounts to a pair of mixer elbows 68, each of which includes a lifting eye 69 for a purpose described below. Each jet pump JP includes a mixer 70 with an Inlet section 72 that is rigidly secured to its associated mixer elbow 68 in a suitable fashion, as by welding. The recirculating flow entering the inlet section 72 its associated mixer elbow 68 is fed to a suction inlet 74, where the mixer inlet section 72 terminates in a nozzle 75 that injects a high velocity stream of recirculating water into a mixer throat 76. This high velocity stream entrains the water in the annular region 52 of the RPV 10 (see FIG. 1), and the recirculating flow and the entrained flow enter an elongated mixing chamber 78 that leads from the suction inlet 74 to an end region 79 (See FIG. 4). The design and construction of the suction inlet and mixer throat can vary from installation to installation and the configurations in FIGS. 2 and 3 are slightly different because FIG. 3 is taken from GE U.S. Pat. No. 4,499,691, while FIG. 2 is based on Pub. No. US 2012/0219103. However, the principles of operation are the same and illustrate the point that the present invention as described and claimed herein is applicable to any jet pump design subject to the problems discussed herein. The mixing chamber 78 serves to eliminate any local flow variations in the combined recirculating and entrained flows entering the throat section 76.

As best seen in FIG. 4, the mixing chamber 78 has an exit at an end region 79 that directs the mixed flow into a separate jet pump diffuser 80, which has an increasing cross-sectional area in the downward flow direction to reduce the flow velocity. The flow in the diffuser 80 exits at its bottom end, which is welded to the baffle plate 56, through one of the jet pump exit openings 54. As best seen in FIG. 4, taken from GE Pub. No. US 2008/0029969, the end region 79 at the exit of the mixing chamber fits within the top region 81 at the inlet of the diffuser 80 to form a slip joint 82. Typically, the end region 79 of the mixing chamber is about seven to nine inches in diameter and the diametrical clearance between the inside of the top region 81 of the diffuser 80 and the end region 79 of the mixing chamber is on the order of 0.020 in. The lifting eye 69 on the mixer elbow 68 has a generally circular lifting opening 69a by which the elbow/mixer assembly is lowered into (and extracted from) the annular region 52, and beveled edges on guide ears 84 at the top of the diffuser 80 assist in inserting the end region of the mixing chamber 78 into the close-clearance top region 81 of the diffuser section 80. The slip joint 82 permits relative movement between the mixer 70 and the diffuser 80, as discussed just below.

Returning to FIG. 3, the jet pump assembly JPA further includes a jet pump beam assembly BA that clamps the mixer elbows 68 to the transition piece 66 to secure in place the mixers 70, which as already noted are rigidly attached to the corresponding mixer elbows 68. The construction of the beam assembly can vary from installation to installation, but FIG. 3 illustrates features of BWR beam assemblies particularly adapted for use with the methods and apparatus described and claimed herein. The beam assembly shown in FIG. 3 includes an inner bracket 90 rigidly secured to the transition piece 66 at the side facing the core shroud 50 and an outer bracket 92 rigidly secured to the transition piece 66 at the side facing the RPV side wall 14. (The outer bracket 92 is partially cut away in FIG. 3 to show the top of its associated mixer elbow 68.) Each jet pump JP has an associated jet pump beam 93 that spans the space between the inner and outer brackets above the mixer elbow 68. The ends of the jet pump beam fit into notches 94 in the respective brackets 90 and 92. A beam bolt 96 threads into an opening located centrally of the jet pump beam 93 and into a blind receiving hole 98 in the top of the associated mixer elbow 68. (The jet pump beam at the partially cut away location is omitted to show the receiving hole 98.) The mixer 60 and its attached mixer elbow 68 are secured in place on the transition piece 66 by tightening the beam bolt 96 in the threaded pump beam opening and into the blind hole 98 to press the mixer elbow 68 against the transition piece 66. In some cases, the beam bolt end is a convex spherical section that mates with an insert in the blind hole 98 having a complimentary concave spherical section to assist in properly aligning the beam 93 and the transition piece 66 as the bolt 96 is tightened into place.

The diametrical clearance shown in FIG. 4 between the end region 79 of the mixing chamber 78 and the top region 81 of the diffuser 80 permits these parts to move radially relative to each other. As noted, the slip joint 82 is necessary to allow relative movement of the mixer and diffuser because of factors such as differential thermal expansion between RPV parts typically made of carbon steel with a stainless steel cladding, and jet pump parts generally made of stainless steel or INCONEL® alloy 600, which operate at temperatures of about 550° F. However, under most operating conditions, some of the main flow MF passes through the slip joint 82 as leakage flow LF (which can be in the direction shown by the arrow LF or in the opposite direction into the diffuser), and the resulting complex flow pattern and pressure fluctuations can cause the mixer and diffuser to oscillate in a phenomenon known as flow-induced vibration (FIV). This may lead to increased metal fatigue and premature failure of the jet pump. Performing repairs on BWR jet pumps is a major undertaking, because any repair that requires access to the interior of the RPV represents a significant expenditure and necessitates shutting down the reactor with a concomitant loss of operating revenue. Moreover, the Integrity of the jet pumps must be assured for safety reasons since they maintain the water level in the RPV in the event of a loss of coolant accident. FIV can also cause reactor parts to loosen and create safety issues, and can cause reactor parts to abrade and shed small particles that can contaminate the reactor.

Nevertheless, the mixing chamber 78 and diffuser 80 cannot be clamped together in any manner that would completely prevent their relative axial movement caused by differential thermal expansion. Accordingly, various constructional approaches have been used in attempts to prevent or inhibit FIV and/or the resulting operational problems it causes. A principal constructional approach uses a restrainer bracket RB (see FIG. 2), described in more detail below. This bracket is rigidly mounted to the riser pipe 60 (typically by welding) and has an opening through which the mixing chamber 78 passes. As described in more detail in connection with FIG. 5, the restrainer bracket provides a three-point mount that includes two fixed set screws and a gravity wedge, typically spaced equally around the inner circumference of the ring opening, that bear against the mixing chamber. Theoretically, the gravity wedge is heavy enough to be held against the mixing chamber by gravity and thereby suppress FIV. GE U.S. Pat. No. 6,788,756 discusses more details of the construction and operation of this type of three-point mount, and some of its shortcomings as an FIV-suppressing mechanism.

While prior art structural arrangements intended to alleviate FIV in nuclear reactor jet pumps are effective to one degree or another, they all suffer from shortcomings. Some employ complex arrangements to connect the mixer and diffuser together in one fashion or another at the slip joint while still allowing for their relative axial movement. Examples are described in U.S. Pat. No. 6,394,765, U.S. Pat. No. 6,450,774, and U.S. Pat. No. 8,197,225. Others seek to attack the problem at its source by altering the flow pattern through the mixing chamber/diffuser interface. Examples of this approach are described in U.S. Pat. No. 4,285,770 and U.S. Pat. No. 6,438,192, and in Pub. No. US 2008/0029969, Pub. No. US 2008/0031741, and Pub. No. US 2012/0219103.

Prior approaches to alleviating FIV that involve the introduction of additional parts at the region of the slip joint add expense (both in materials and installation cost), increase the likelihood of loose parts in the RPV, and in some cases can increase the difficulty of removing the mixer for replacement or repair. U.S. Pat. No. 6,788,756 discusses modifications to the gravity wedge arrangement discussed just above, with the object of rendering it more effective in suppressing FIV, but those modifications also require additional parts, are difficult and costly to implement, and are not always effective. Generally speaking, any approach that uses additional hardware complicates inspection of the jet pump assembly, reduces clearances and thus makes access for maintenance to areas in the annular region 52 more difficult, and adds a potential cause of failure. Other prior approaches, particularly those that seek to alter the flow pattern at the slip joint, require machining a special contour on the mixing chamber or the diffuser at or near the slip joint. Machining these parts can be expensive, and the resulting alteration in the flow pattern at the slip joint may not alleviate FIV under all operating conditions. Moreover, this approach requires special handling since a mixer that has already seen service in an operating reactor will be highly radioactive, thus adding even more to the cost and complexity of implementing this approach.

Another complicating factor is that not all jet pumps exhibit flow-induced vibration when the reactor is operating. For example, experience shows that in a typical BWR with 20 jet pumps, all of which are made to the same specifications and for all intents and purposes are identical, it is nevertheless common for only some to experience FIV. In addition, one reactor installation may have certain of its jet pumps experience FIV while another reactor installation will have more or fewer jet pumps that experience FIV and that are in different locations around the reactor core-even though the different reactors and the jet pumps are nominally identical.

Another approach to dealing with jet pump FIV is to apply one of the known FIV-alleviating approaches preemptively to all of the jet pumps in a particular reactor, before even knowing which ones, if any, will experience FIV during reactor operation. This is also an imperfect solution because it "fixes" jet pumps that might not be susceptible to FIV in the first place. And since all of the known approaches are expensive, they add to reactor cost, probably unnecessarily to some extent (since many of the jet pumps likely would not have experienced FIV anyway). Moreover, some prior art approaches can even exacerbate rather than alleviate FIV.

SUMMARY OF THE INVENTION

It is an object of the present invention to alleviate FIV at the slip joint between the mixing chamber and diffuser in a nuclear reactor jet pump, without installing additional parts or altering the construction of the slip joint. In a particularly favorable embodiment of the invention, the method can be performed without requiring direct access to the slip joint.

One method aspect of the invention takes advantage of a property of jet pumps installed in a reactor whereby a transverse contact load between the jet pump mixer and diffuser at the slip joint can suppress FIV. One preferred embodiment of the methods disclosed and claimed herein determines the quantitative relationship between the onset of FIV and the mixer/diffuser transverse contact load, and positions the mixer and diffuser when the reactor is not operating ("cold" conditions) to provide the necessary transverse contact load to suppress FIV under operating conditions. "Transverse contact load" refers to the force exerted generally normal to the diffuser flow axis at the slip joint. It is sometimes referred to herein as a mixer/diffuser side load, slip joint contact load, or other equivalent term, which those skilled in the art will understand from the context in which they are used.

The particular cold positions of the mixer and diffuser at the slip joint that will provide the necessary mixer/diffuser side load to suppress FIV under operating conditions are determined in accordance with a mathematical or structural analysis on a representative reactor configuration to determine the quantitative relationship between mixer/diffuser transverse contact load at the slip joint under cold conditions and at operating conditions. This, together with knowledge of the quantitative relationship between the onset of FIV and mixer/diffuser transverse contact load, enables a prediction to be made as to whether any particular jet pump in a reactor will experience FIV. Alternately, the quantitative relationship may be determined by measurements in the reactor.

One approach used in a preferred embodiment of the method uses a unique mixer adjustment device that moves the mixer of a jet pump installed in a reactor into the desired position for FIV-suppression by rotating the mixer elbow about its mounting to the transition piece. The device applies a force or torque proximate to the top of the mixer where it is accessible and measures how much it translates. A plot of the torque applied to the mixer versus the amount it translates provides data that can be converted to an algorithm that enables a determination to be made of the position the mixer must occupy when cold to cause the slip join transverse contact load to be sufficient to suppress FIV when the reactor is operating.

An alternate approach uses a unique contact load measuring device to measure under cold conditions the magnitude and direction of the mixer/diffuser transverse contact load in a jet pump installed in a reactor. If the contact load under cold conditions will provide the contact load during reactor operation required to suppress FIV, the mixer and diffuser relative positions do not need to be changed. If not, the first approach described above is used to determine how much and in what direction to move the mixer to provide the necessary transverse contact load to suppress FIV.

In one aspect of the invention a method of suppressing flow-induced vibration (FIV) in a jet pump for recirculating water in a nuclear reactor, the jet pump including a mixer for accepting recirculated water and a diffuser for accepting the water from the mixer, wherein an end region of the mixer fits within an inlet region of the diffuser at a slip joint with a radial clearance between the mixer and the diffuser comprises (a) determining a first quantitative relationship between (i) an applied transverse contact load between the mixer and diffuser at the slip joint, and (ii) a property of the flow through the slip joint from the end region of the mixer to the inlet region of the diffuser that causes FIV, (b) determining a second quantitative relationship between (i) a cold transverse contact load between the mixer and diffuser at the slip joint when the reactor is not operating, and (ii) an operating transverse contact load between the mixer and diffuser at the slip joint under reactor operating conditions, and (c) positioning the mixer and diffuser relative to each other when the reactor is not operating based on the second quantitative relationship so as to provide a predetermined cold transverse contact load at the slip joint that will result in an operating transverse contact load at least as large as that correlated to the property of the flow through the slip joint that causes FIV as indicated by the first quantitative relationship at a particular reactor operating conditions.

In another aspect of the invention, a method of predicting if a jet pump for recirculating water in a nuclear reactor is susceptible to flow-induced vibration (FIV), the jet pump including a mixer for accepting recirculated water and a diffuser for accepting the water from the mixer, wherein an end region of the mixer fits within an inlet region of the diffuser at a slip joint with a radial clearance between the mixer and diffuser, comprises (a) determining a first quantitative relationship between (i) an applied transverse contact load between the mixer and diffuser at the slip joint, and (ii) a property of the flow through the slip joint from the end region of the mixer to the inlet region of the diffuser that causes FIV, (b) determining a second quantitative relationship between (i) a cold transverse contact load between the mixer and diffuser at the slip joint when the reactor is not operating, and (ii) an operating transverse contact load between the mixer and diffuser at the slip joint under reactor operating conditions, and (c) measuring the cold transverse contact load between the mixer and diffuser at the slip joint to make a prediction based on the second quantitative relationship as to whether the cold transverse contact load will result in an operating transverse contact load at least as large as that correlated to the property of the flow through the slip joint that causes FIV as indicated by the first quantitative relationship at a particular reactor operating conditions.

An additional feature of this method is used if the measuring step predicts that the operating transverse contact load will be less than the transverse contact load correlated to the property of the flow that causes FIV as indicated by the first quantitative relationship at the particular reactor operating condition, the additional method feature comprising positioning the mixer and diffuser relative to each other when the reactor is not operating based on the second quantitative relationship so as to provide a predetermined cold transverse contact load at the slip joint that will result in an operating transverse contact load at least as large as that correlated to the property of the flow through the slip joint as indicated by the first quantitative relationship.

This Summary is provided solely to introduce in a simplified form a selection of concepts that are described in detail further below. It is not intended necessarily to identify key or essential features of the subject claimed herein, nor is it intended to be used an aid in determining the scope of the claimed subject matter.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 7, comprising FIGS. 7A and 7B, is a top view of the conceptual representation of FIG. 5 taken in the direction indicated by the arrow labeled FIG. 7 in FIG. 5.

FIG. 8, comprising

FIG. 11, comprises FIGS. 11A and 11B, wherein

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein. It will also be understood that terms indicating direction or orientation, such as "lower," "upper," "top," "left," "right," etc., may be used throughout to facilitate description. The use of such terms does not imply that the claimed subject matter is limited to a particular orientation of the structure being described.

I. General Principles Underlying the Invention

Figure 4:
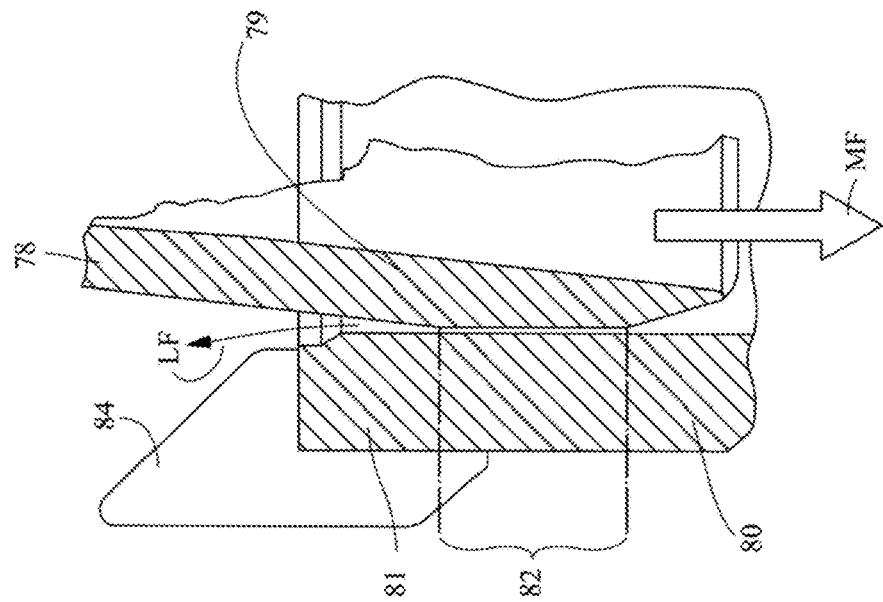
FIG. 4 is a cross-sectional view of a conventional slip joint where the end region at a jet pump mixing chamber exit fits inside the inlet of the jet pump diffuser with a radial clearance therebetween.
Figure 5:
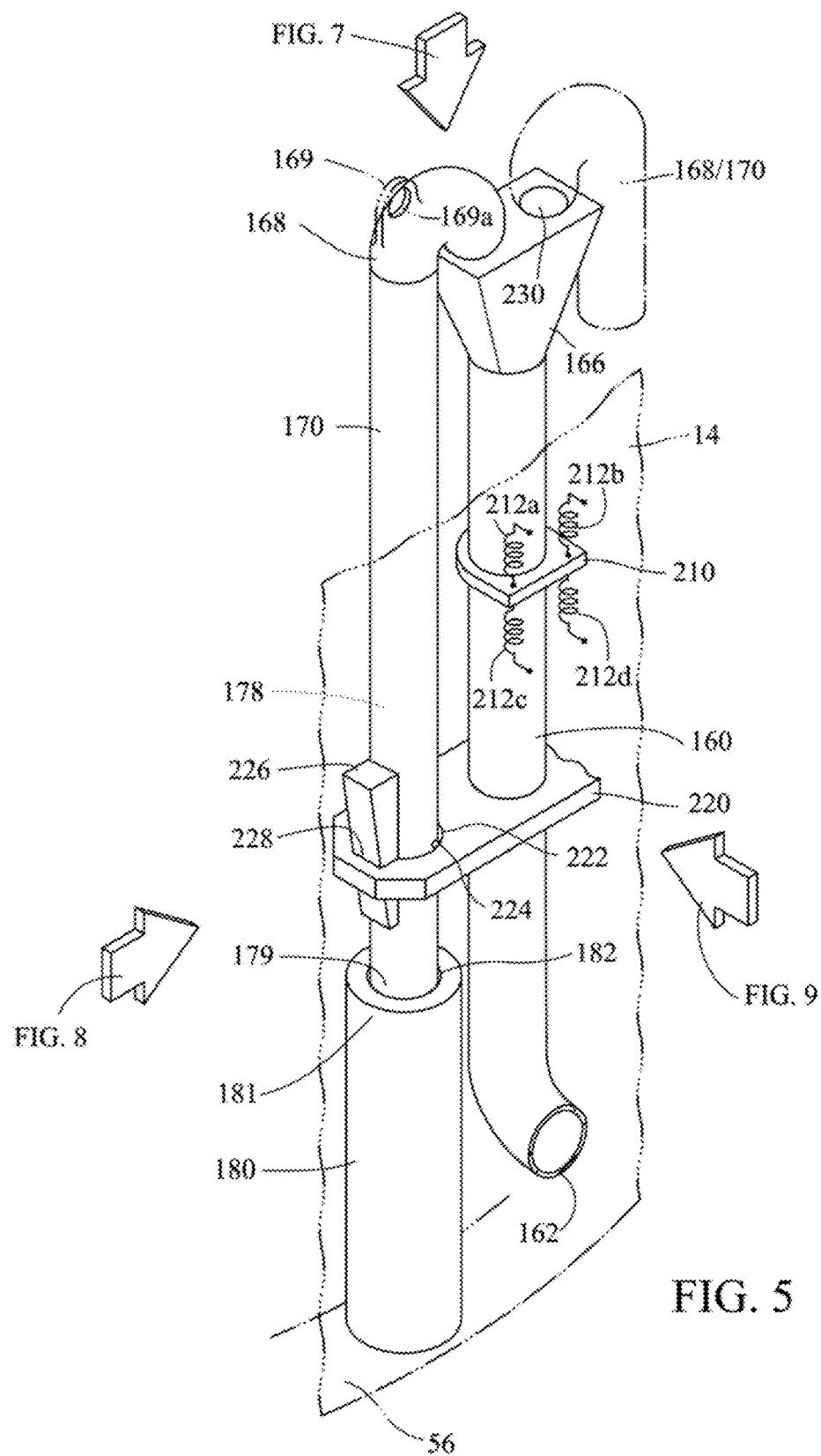
FIG. 5 is a conceptual representation of part of a jet pump assembly used to illustrate certain principles underlying the present invention.

FIG. 5 is a conceptual model of a jet pump assembly JPA like that in FIGS. 1 to 4. This model is used to illustrate certain principles underlying method aspects of the present invention for suppressing FIV without the disadvantages of known conventional approaches. The modeled parts of the jet pump assembly that correspond to their actual counterparts shown in FIGS. 1 to 4 are given corresponding "100" numerals in FIG. 5. For example, the riser pipe 60 in FIGS. 1 to 4 is identified by the numeral 160 in FIG. 5, and is rigidly secured to a transition piece 166. Note that the configuration of the riser pipe 160 and the transition piece 166 is stylized in FIG. 5; the salient feature being that they are rigidly connected and thus can be considered as one piece for purposes of understanding the methods to be described in more detail herein. Parts of the jet pump assembly not heretofore identified by reference numerals are given "200" series numerals that do not refer to previously used numerals.

The riser pipe 160 is modeled here as rigidly secured at the riser pipe inlet elbow 162 to the RPV side wall 14, shown in phantom in FIG. 5, in the manner described above in connection with FIG. 2. At a location proximate to the transition piece the riser pipe 160 is secured to the RPV side wall 14 by a riser brace 210. The highly schematic depiction of the riser brace here represents structure that on one hand is rigidly connected, typically by welding, to the riser pipe 160 (60), and on the other is connected by stiff leaf springs welded at their ends to the RPV side wall 14. FIG. 5 represents the leaf spring mounting by coil springs 212a, 212b, 212c, and 212d. (It will be appreciated that the coil springs do not exactly model leaf springs, which will provide a relatively stiff riser pipe mounting in the radial and transverse directions.) This riser brace mounting structure supports the riser pipe 160 (60) at the RPV side wall in a manner that permits movement of the riser pipe in the axial direction relative to the RPV side wall, while limiting the magnitude of riser pipe vibration caused by FIV of the jet pump assembly as a whole.

Figure 1:
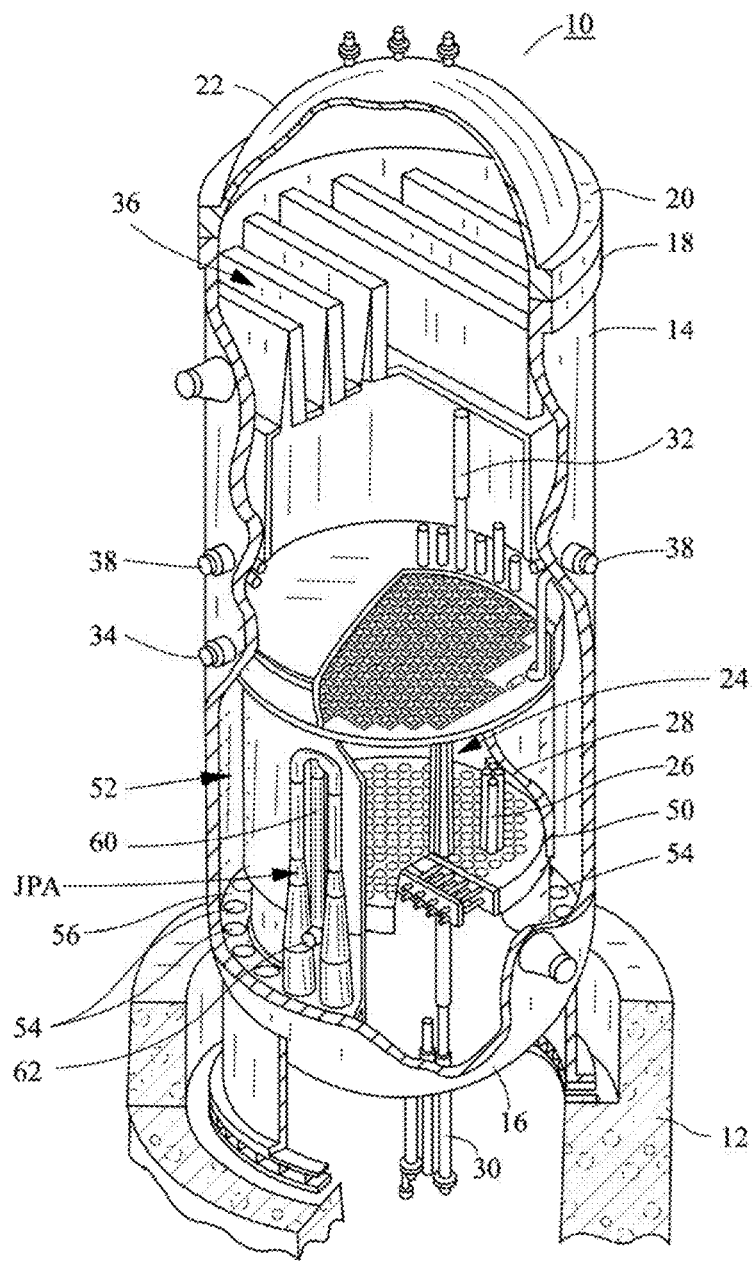
FIG. 1 is a cut-away isometric view of a boiling water reactor having a construction typical of nuclear reactors to which the present invention can be applied.
Figure 2:
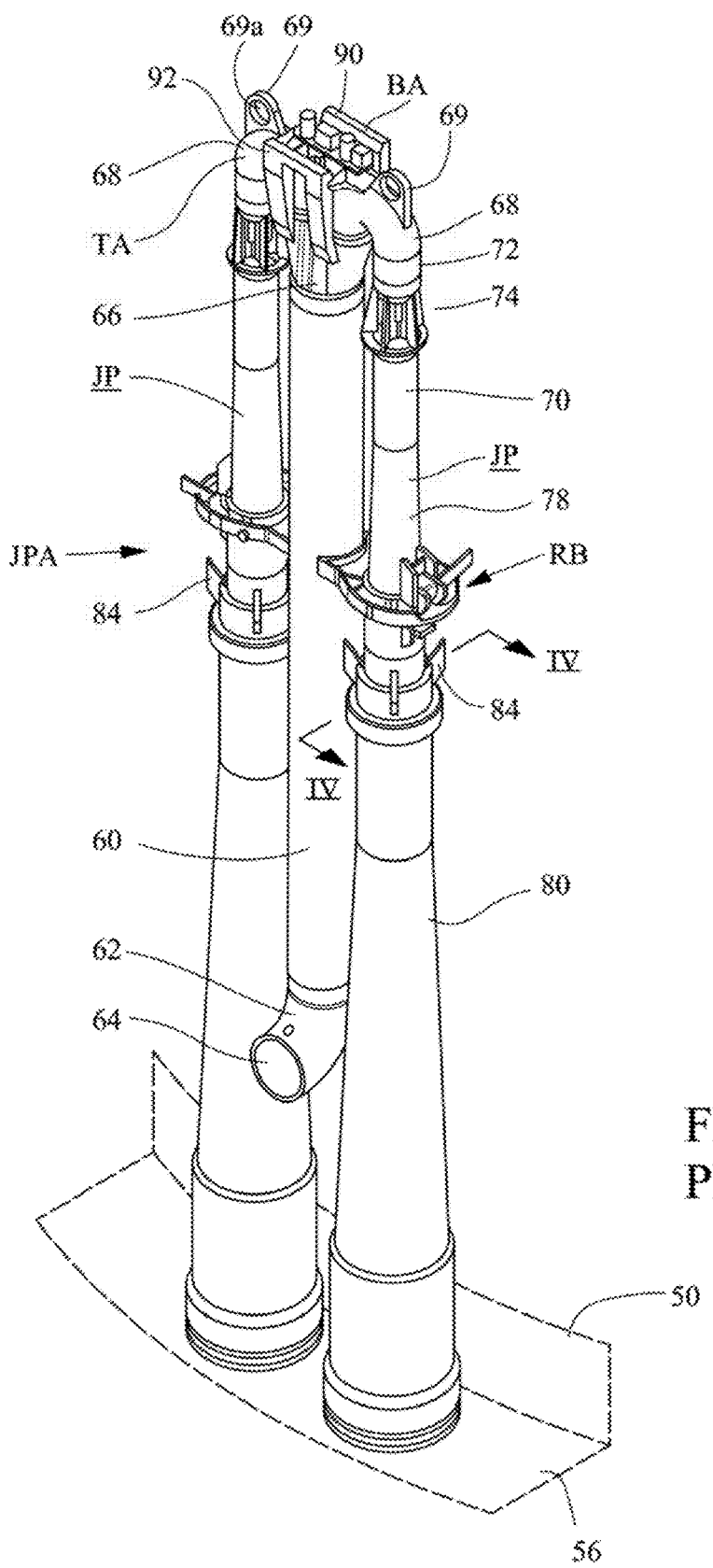
FIG. 2 is a schematic isometric view of a conventional jet pump assembly with two jet pumps used in the BWR shown in FIG. 1.
Figure 3:
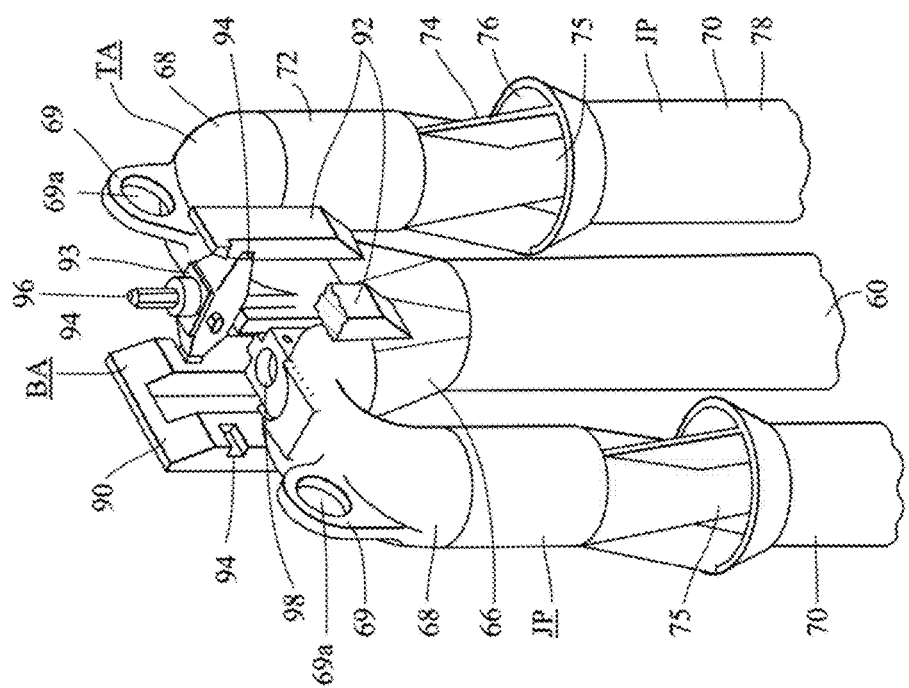
FIG. 3 is an enlarged isometric view of a top region of a conventional jet pump assembly as shown in FIG. 2, depicting the transition assembly with a transition piece that distributes recirculating water from a riser pipe to a pair of mixer elbows in fluid communication with respective jet pumps of the jet pump assembly.

Conceptually, the mixer elbow 168 and the jet pump mixer 170 comprise a one-piece unit. That is, the mixer elbow 68 and the jet pump mixer 70 in FIGS. 1 to 3 are welded together, and thus can be considered as an integral unit. (The jet pump suction inlet 74 and nozzle 75 are not depicted separately in FIG. 5 since they can be modeled as an integral part of the mixer 170). The lifting eye 169 (with its lifting opening 169a) is shown here in phantom because it is utilized in at least some of the FIV-suppression methods described herein, but does not per se comprise part of the FIG. 5 model used to illustrate the jet pump's mechanical characteristics. As described in connection with FIG. 3, the mixer elbow 168 is held firmly and rigidly in place against the transition piece 166 by the jet pump beam assembly BA (omitted from FIG. 5 for clarity). Accordingly, the jet pump's riser pipe 60 (160), transition piece 66 (166), mixer elbow 68 (168) and mixer 70 (170) for purposes of the present description are considered to be essentially a single piece.

Turning to the diffuser 180, it is welded rigidly at its bottom to the jet pump baffle plate 56, shown in phantom in FIG. 5. From this depiction, it can be appreciated that the diffuser 180 is in effect a cantilever beam fixed at one end and elastically deformable at the top region 181 where it forms the slip joint 182 with the end region 179 of the mixing chamber. In other words, the diffuser can bend elastically along its length, with the effect at the slip joint 182 of presenting a spring force resisting deformation of the diffuser in all directions transverse to the diffuser axis (see FIG. 7). The end region 179 of the mixing chamber 178 fits within the diffuser 180 with a clearance reflecting the diametrical clearance at the slip joint 182 (82). (See FIG. 4.) This conceptualized model of a jet pump assembly also enables visualization of the relative movement between the mixer and the diffuser that occurs under reactor operating conditions as compared to their positions under cold conditions. On the one hand, the jet pump's riser pipe, transition piece, mixer elbow, and mixer are a single piece that is rigidly mounted to the RPV at the riser pipe inlet elbow 162 (62), and is supported by the RPV wall 14 at the riser brace 210 in the fashion discussed above. On the other hand, the jet pump diffuser is rigidly mounted only at its bottom to the jet pump baffle plate 56 of the RPV. Influences such as differential thermal expansion because different reactor parts are made of different materials, pressure within the RPV, and hydrodynamic forces resulting from the large mass flow of the recirculating water flow, all cause the mixer and the diffuser to move from their respective cold positions. The slip joint 82 (182) permits relative movement between the end region 79 (179) of the mixer and the top region of the diffuser 81 (181).

The mixer restrainer bracket RB (see FIG. 2) is intended to suppress FIV. It is depicted conceptually in FIG. 5 by a flat plate 220 rigidly secured to the riser pipe 160 and having a circular opening 222 through which the jet pump mixer 170 passes. Although the actual restrainer bracket RB is more complex in construction than this conceptual model, it essentially comprises a mount for the mixer 70 in a circular opening like the one in FIG. 5. The mixer 170 (or, more accurately, the mixing chamber 178) is supported in the opening 222 by a three-point mount consisting of two protrusions 224 representing set screws (only one of which is shown in FIG. 5) and a gravity wedge 226 that fits into a cut-out 228 in the opening 222. The protrusions and the wedge are evenly spaced circumferentially around the opening, as they are in an actual jet pump construction. In an actual installation, the set screws are welded into place after the mixer 70 is in place, and thus they are represented in FIG. 5 as protrusions extending radially inward a fixed distance.

The intended effect of the restrainer bracket RB assembly (220) is that the gravity wedge 226 under its own weight will maintain a radial force on the mixer 170 (70) and hold the mixer against the set screws (protrusions 224) when the BWR is operating—thereby suppressing FIV. However, when the jet pump is subjected to unstable flow through the slip joint 82 (182) during reactor operation, FIV can loosen the gravity wedge and even cause the mixer to lose contact with the set screws (protrusions 224), which lessens the ability of the gravity wedge/set screw arrangement to alleviate FIV-caused damage. Moreover, it is still possible to experience FIV severe enough to damage reactor parts even when the gravity wedge and set screws maintain good contact with the mixer, since this arrangement does not actually address the root cause of FIV, which is the flow instability at the slip joint discussed above in connection with FIG. 4. The methods and apparatus described and claimed herein address the drawbacks of known solutions to FIV-induced reactor damage.

Tests reported over 30 years ago confirmed that under operating conditions, jet pump components, including the mixer and diffuser, become displaced from the positions they occupied under cold conditions. J. F. Schardt, "Flow-induced Vibration for Light-Water Reactors," General Electric Co. GEAP-24248 (DOE/N/4175-14), March 1980, pages 2.3-10 to 2.3-11). This report included data which showed movement of the jet pump parts after about 100 hours of operation created a transverse load between the diffuser and mixer at the slip joint, and that the transverse load increased the differential fluid pressure across the slip joint at which FIV began. Other tests have also showed that a transverse load between the mixer and diffuser at the slip joint can decrease or eliminate jet pump FIV. LaCroix, L. V., "Flow-Induced Vibration Characteristics of the BWR/5-201 Jet Pump," General Electric Co. GEAP-22211 (DOE No. AC02-77ET34209), September 1982, page 4-3. Nevertheless, there has heretofore been no known method of predicting whether any specific jet pump, as installed, will experience FIV under operating conditions, or how to provide a mixer/diffuser transverse contact load sufficient to suppress FIV when the reactor is operating.

Certain aspects of the present invention involve unique methods for predicting whether or not a particular jet pump will be susceptible to FIV in use, and then, if necessary, providing a likewise unique methodology for modifying/ customizing the jet pump installation to ensure FIV suppression. Referring to the FIG. 5 conceptual model, certain method aspects of the invention follow from the Implications of being able to visualize the diffuser 80 (180) as a cantilever beam that resists bending with a known spring constant. Thus, deliberately introducing relative lateral displacement (transverse to the mixer/diffuser axis) between the mixer and diffuser from their nominal positions (FIG. 4) will enable the creation of a known radial contact force or load between these two components transverse to the mixer/diffuser axis at the slip joint 82. One aspect of the invention in a preferred form comprises determining by testing or computation the relationship between the transverse contact load between the mixer and diffuser at the slip joint and the slip joint differential pressure at which FIV begins ("onset SJDP"), under various operating conditions of a given jet pump design. The method further involves performing a computational analysis of an actual jet pump made and installed in a specific reactor according to the same design to calculate and compare the transverse contact loads at the slip joint under cold conditions and under operating conditions. The method is then applied to ensure that the jet pump is configured with the mixer/diffuser positions under cold conditions such that the transverse contact load between the mixer and diffuser under operating conditions exceeds the value correlated with onset SJDP.

II. A Preferred Method Embodiment of the Invention

Figure 6:
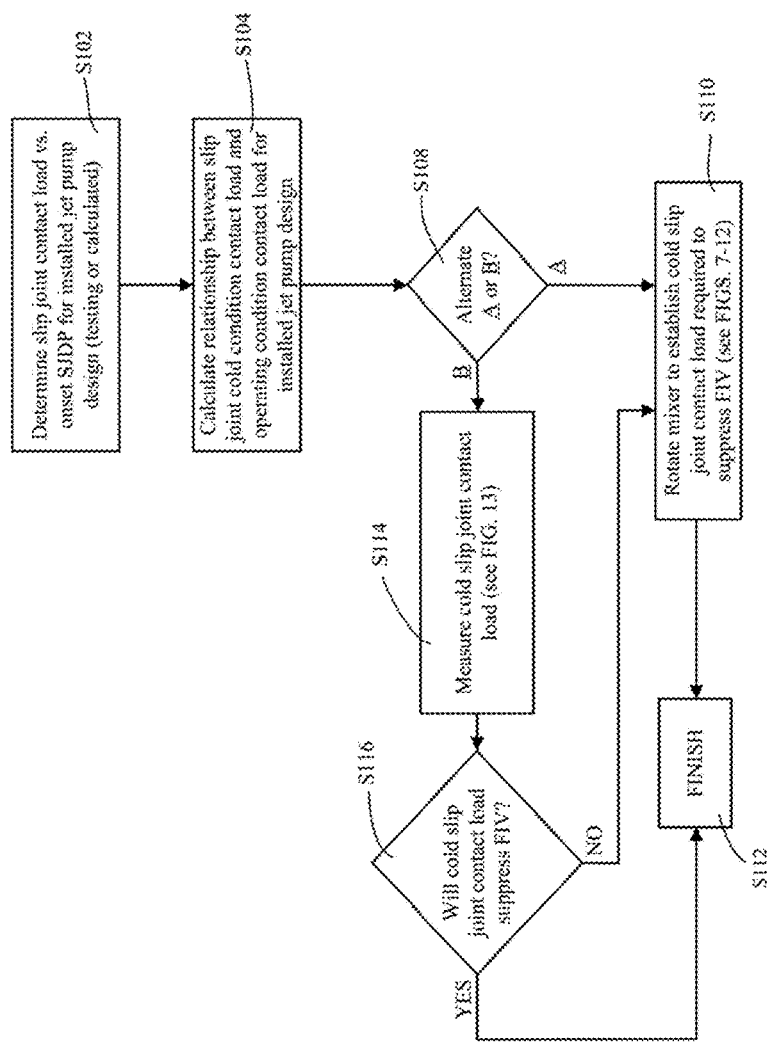
FIG. 6 is a flow chart illustrating certain steps in one method embodiment of the invention.

FIG. 6 is a flow chart that illustrates salient steps in one embodiment of a method in accordance with the present invention as applied to the jet pumps of a particular reactor. The first step S102 illustrated in FIG. 6 involves determining the relationship between onset SJDP and mixer/diffuser slip joint transverse contact loads for a jet pump configuration simulating jet pumps installed in the reactor to which the method is to be applied. In one preferred form, the step S102 comprises performing tests on a full-scale operational mock-up of a jet pump to empirically determine onset SJDP in relation to mixer/diffuser transverse contact loads under various operating conditions. In a typical implementation, the mock-up will be a full-scale reproduction of an installed jet pump JP as shown in FIG. 2. The object is that the geometry and construction of the mock-up jet pump, and the manner of mounting it within a reactor, reproduce as closely as possible actual installed jet pumps to which the method is to be applied. Alternatively, a theoretical relationship between onset SJDP and mixer/diffuser transverse contact loads can be determined analytically using known finite element method (FEM) and computational fluid dynamics (CFD) techniques to model mathematically an actual jet pump installation. Further details regarding one method of empirically making the determination represented by the step S102 are described further below.

The next method step S104 illustrated in FIG. 6 is applied to a specific jet pump design installed in a specific reactor, and comprises calculating how far and in what directions the mixer and diffuser move relative to each other during reactor operation from their positions when under cold conditions. The calculation in step S104 is performed by applying known FEM analytical techniques to an actual reactor and jet pump construction to which the method is applied. The FEM calculation is preferably applied to all of the reactor and jet pump components that might affect the movement of the jet pump mixer and diffuser at the slip joint. This would include, for example, not only the jet pump components (the mixer, diffuser, riser pipe, transition piece, mixer elbow, etc.), but also reactor components such as the reactor pressure vessel itself, the core shroud, the jet pump baffle plate, etc. More or fewer parts can be taken into account in the FEM mathematical model depending on the level of accuracy desired. This calculation predicts the relative movement of the jet pump mixer and diffuser at the slip joint from their cold positions as compared to their positions under operating pressures and temperatures. Some of the factors that cause this movement have been mentioned, and include differential thermal expansion, hydrodynamic forces, radial and axial expansion of the RPV wall due to the large internal pressures at which the RPV operates, deformation of the let pump baffle plate due differential pressures across it when the reactor is operating, changes in material properties due to temperature effects and high radioactivity, and other possible contributing factors. It is also possible to determine the quantitative relationship represented by the step S104 using data provided by appropriate instrumentation placed in an actual reactor.

The FEM analysis will preferably be performed in combination with a CFD analysis to account for pressure and momentum effects and hydrodynamic forces on the jet pumps and other reactor components caused by the large mass flow of the recirculating water. These forces, and the resulting deflections of the reactor and jet pump components, can be significant, particularly since the recirculating mass flow is relatively large and experiences changes in direction and area from its entry into the inlet of the riser pipe at the RPV side wall and its exit from the diffuser and redirection into the reactor core. (See FIGS. 1 and 5.) One result of the FEM/CFD analysis is the relationship between cold-condition transverse contact loads at the slip joint vs. the slip joint transverse contact loads under operating conditions. In other words, the step S104 calculation predicts the slip joint transverse contact load under operating conditions for a given slip joint contact load when the jet pump is "cold" (that is, not operating). The calculation takes into account the direction and magnitude of the cold contact load to determine the direction and magnitude of the operating contact load.

The combined result of the steps S102 and S104 are predictions of (i) the mixer/diffuser transverse contact load at the slip joint under operating conditions, based on the contact load as installed, and (ii) the mixer/diffuser transverse contact load that will suppress FIV under operating conditions. As noted, the step S104 can take into account that a reactor may operate under different conditions and that FIV must be suppressed at all of them. Accordingly, the method for FIV suppression described herein would preferably use the highest calculated operational slip joint transverse contact load required for FIV suppression from all of the operating conditions examined as part of the calculation in the step 104. The order in which the steps S102 and S104 are described herein is for convenience only, and it will be appreciated that these steps can be performed in any order.

The remainder of the flow chart in FIG. 6 explains how this method embodiment is applied to a particular jet pump in a specific reactor. In a preferred application of the method, the results of the model tests (or theoretical analyses of slip joint transverse load vs. onset SJDP) described in connection with the step S102 are used with different jet pump designs in different reactors or even different reactor designs. A main factor in the ability to apply the results of the step S102 to different jet pump designs is the extent to which different jet pump and reactor configurations might change the structural response of the jet pump to the flow instabilities at the slip joint. In addition, a preferred implementation of the method uses the same FEM/CFD analysis performed in step S104 for all of the jet pumps in the reactor to which the method is applied. However, if different jet pumps in the same reactor have sufficiently different configurations, the efficacy of the method can be improved by performing individual FEM/CFD analyses for the jet pumps with different structural characteristics.

Initially, step S108 of the method shown in FIG. 6 represents a decision that can be made between two alternate approaches A and B. Alternate approach A, described first below, uses a technique described in more detail in connection with FIGS. 7-12, which involves altering the mixer position to place the mixer of the jet pump into a position to create a desired transverse contact load at the slip joint under cold (non-operating) conditions, based on the results of step S104, so as to exert a transverse load that will suppress FIV when the reactor is operating, based on the results of step S102. Alternate approach B, discussed in detail further below with reference to FIG. 13, measures the actual transverse contact load between the mixer and diffuser under cold conditions, allowing a determination to be made based on the results of step S104 as to whether or not the transverse contact load under operating conditions will be sufficient for FIV suppression. If not, the mixer is moved as in alternate approach A to ensure that the operating contact load will suppress FIV.

A. Alternate Approach A

Figure 8A:
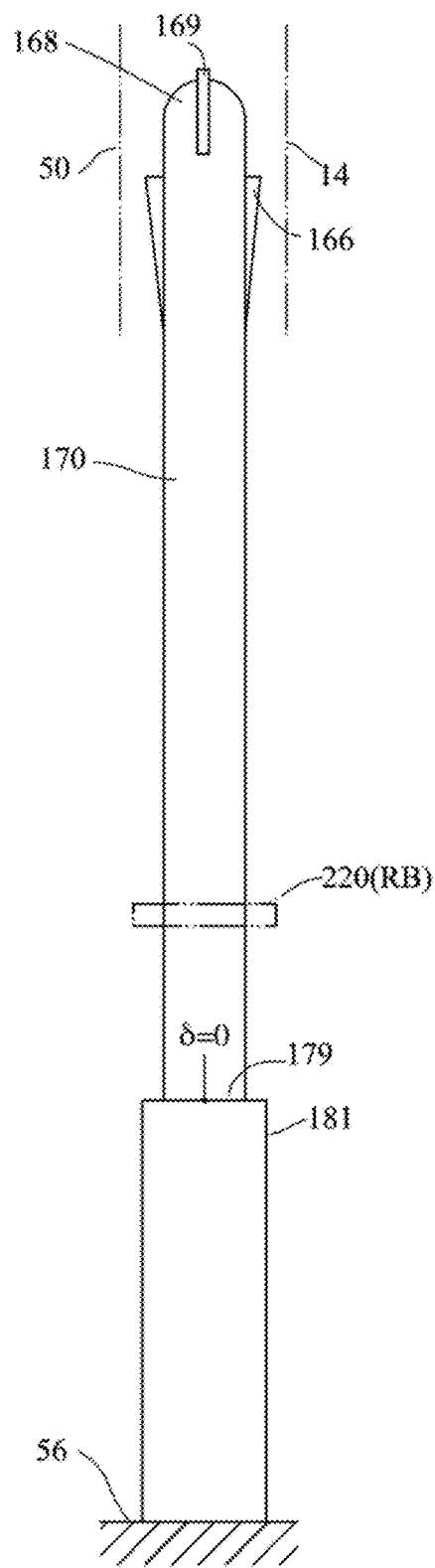
FIGS. 8A and 8B, is a side view of the conceptual representation of FIG. 5 taken in the direction of the arrow labeled FIG. 8 in FIG. 5.
Figure 8B:
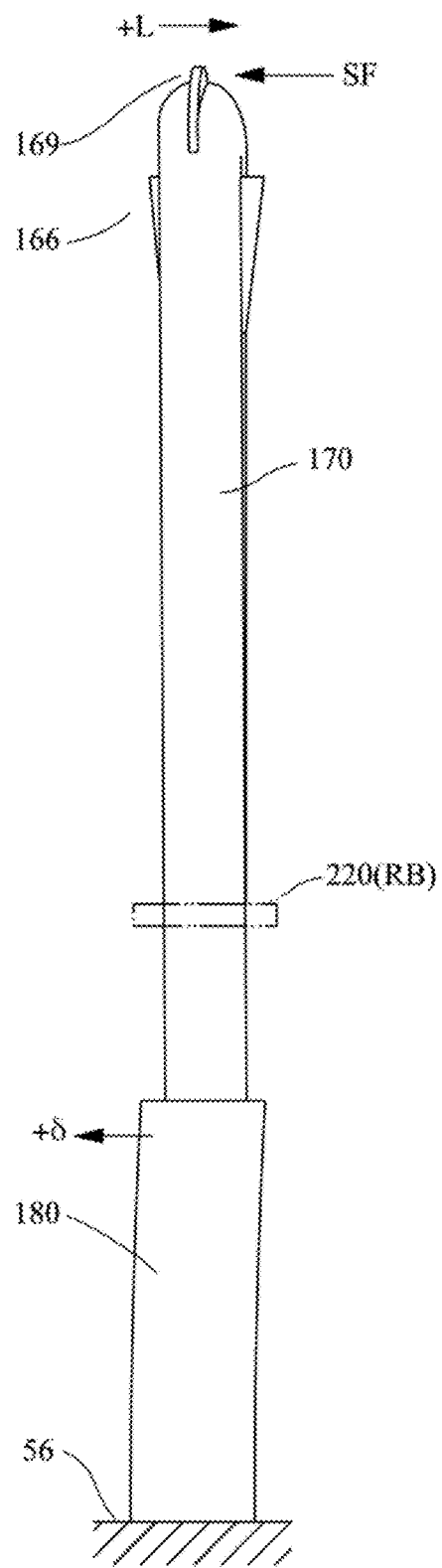
Figures 9, 10:
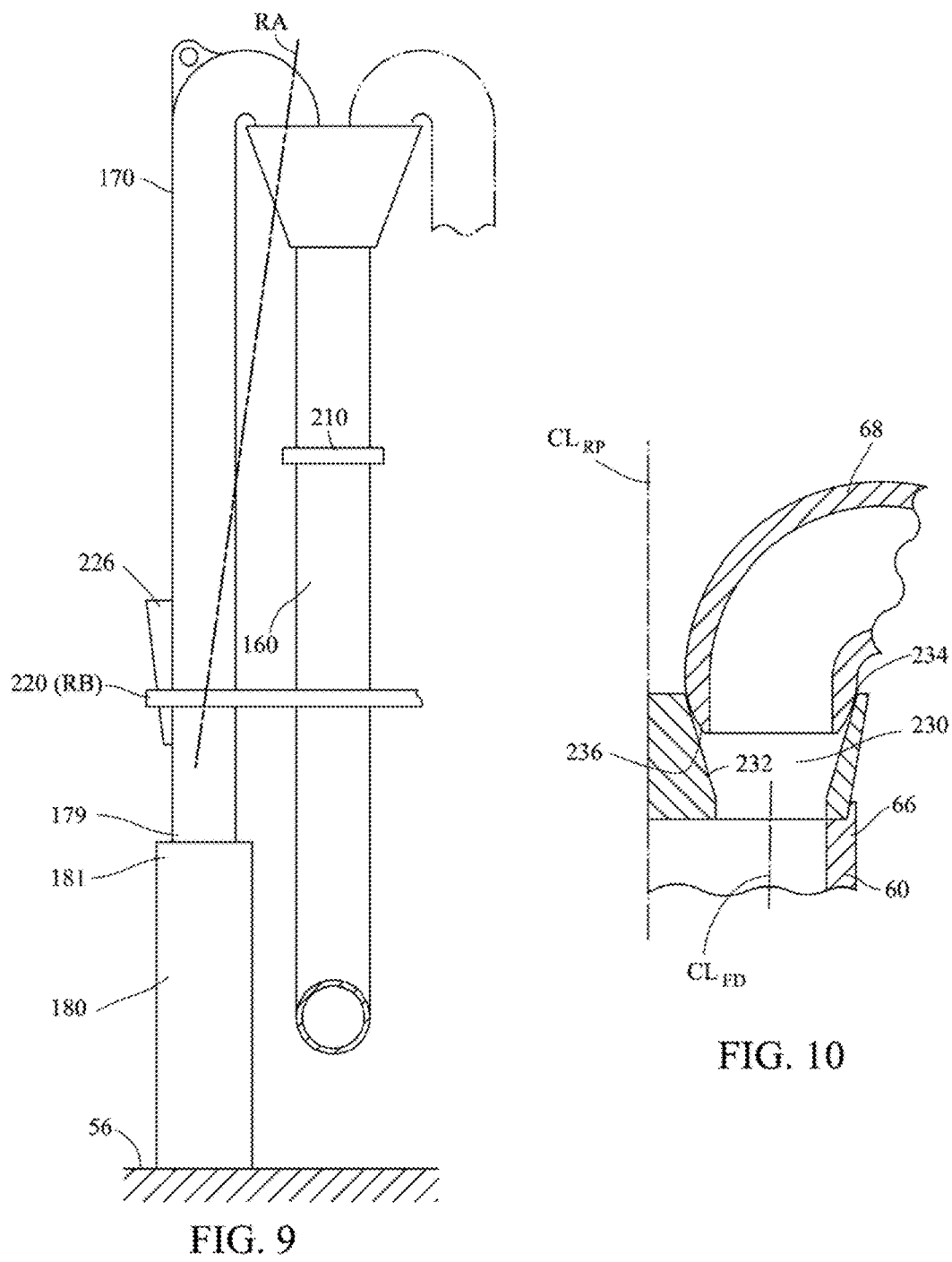
FIG. 9 is a front view of the conceptual representation of FIG. 5 taken in the direction of the arrow labeled FIG. 9 in FIG. 5.
FIG. 10 is a schematic cross-sectional depiction of a jet pump mixer elbow to transition piece mounting arrangement used in implementing an embodiment of the present invention.

One embodiment of the step S110 of the method in FIG. 6 can be understood by first considering FIGS. 7-9, wherein FIG. 7 is a top view of the jet pump modeled in FIG. 5, viewed in the direction of the arrow labeled "FIG. 7," FIG. 8 is a side view of the jet pump modeled in FIG. 5, viewed in the direction of the arrow labeled "FIG. 8," and FIG. 9 is a front view of the jet pump modeled in FIG. 5, viewed in the direction of the arrow labeled "FIG. 9." These views illustrate how visualizing the diffuser as a cantilever beam with an end (the diffuser top region 181) that can be deflected radially to exert a transverse contact force at the slip joint. This transverse contact load is illustrated conceptually by the orthogonally disposed coil springs 180a, 180b, 180c, and 180d shown in FIG. 7, each with a fixed first end and a second end connected to the diffuser end portion. (The "springs" are omitted from FIGS. 8 and 9 for clarity.) In reality, the transverse contact force at the slip joint depends on various structural considerations, such as the stiffness of the mixer and the stiffness of the diffuser itself and of the baffle plate 56 to which the bottom of the diffuser is mounted. The contribution of all of the various reactor and jet pump components to creating the transverse load between the mixer and the diffuser can be accounted for in the FEM analysis discussed above in connection with the step S104. Alternatively, the slip joint transverse contact load vs. the amount of deflection of the diffuser can be determined empirically using the full-scale operational jet pump mock-up used in the tests described above in connection with the step S102. Either way, the transverse contact load in relation to the diffuser deflection reflects the action of these "springs," but they are depicted here mainly as a way to visualize the transverse contact load applied to the diffuser and mixer at the slip joint when the diffuser is deflected.

FIGS. 7A, 8A, and 9A show the mixer and diffuser in their nominal positions with a radial gap between the mixer end region 179 and the diffuser top region 181 at the slip joint 182. FIGS. 7B, 8B, and 9B illustrate the positions of the mixer and diffuser after the mixer has been displaced by a side load SF on the mixer lifting eye 169 in a manner described below in connection with FIGS. 10 and 11. As described further below, the side load SF can be applied in either direction to rotate the mixer 170 about a fulcrum provided by the restrainer bracket RB (220 in FIG. 5). The side views in FIGS. 8A and 8B correspond to the top views in FIGS. 7A and 7B, respectively, and further illustrate the rotation of the mixer 170 under the application of the side load SF on the lifting eye 169 about a fulcrum provided by the restrainer bracket RB (220). Likewise, the front views of FIGS. 9A and 9B correspond respectively to the top views in FIGS. 7A and 7B and the side views in FIGS. 8A and 8B. FIG. 9 best shows the rotational axis RA of the mixer about the fulcrum provided by the retainer bracket when performing the step S110 of alternate approach A according to the flow chart of FIG. 6.

1. Embodiment of an Apparatus for Effecting Method Step S110

Although the cold-condition positions of the mixer 70 and diffuser 80 can be fixed in a variety of ways in implementing the relevant method steps of this aspect of the invention, the step S110 in FIG. 6 contemplates taking advantage of the manner in which the mixer elbow 68 connects to the transition piece 66 and thereby enables rotation of the unitary one-piece elbow 68 (168) and mixer 70 (170) about the axis RA by applying the side load SF on the mixer lifting eye. The features of this mounting arrangement salient to the present discussion are depicted in FIG. 10, which is a schematic partial cross-section through the transition piece 66 and the riser pipe 60 in a plane bisecting the transition piece and including the centerline $CL_{RP}$ of the riser pipe. The transition piece is essentially symmetrical about the centerline $CL_{RP}$ and has a pair of circular fluid ducts 230, only one of which is shown in FIG. 10. (See FIG. 5.) Each fluid duct has a centerline $CL_{FD}$ in the same plane as the drawing. The fluid duct includes a circular frustoconical portion 232 that increases in diameter to an opening 234 at the top of the transition piece. The end region 236 of the mixer elbow 68 is a section of a sphere and fits within the opening 234. This spherical section bears against the flat conical surface 232 of the transition fluid duct 230, and the centerline $CL_{FD}$ passes through the center of the sphere. This mounting arrangement enables the mixer elbow 68, and thus the entire one-piece elbow/mixer unit, to rotate in any direction and about any axis relative to the transition piece. In the present embodiment, the jet pump beam bolt 96 (FIG. 3) is loosened to enable the unitary elbow/mixer to rotate about the axis RA under the application of a side load SF in either direction. Once the mixer is in a "cold" position such that FIV will be suppressed when the reactor is operating, the beam bolt is retightened to hold the elbow/mixer unit in place. Determining that cold position will now be described with reference to FIGS. 11 and 12.

Figure 11A:
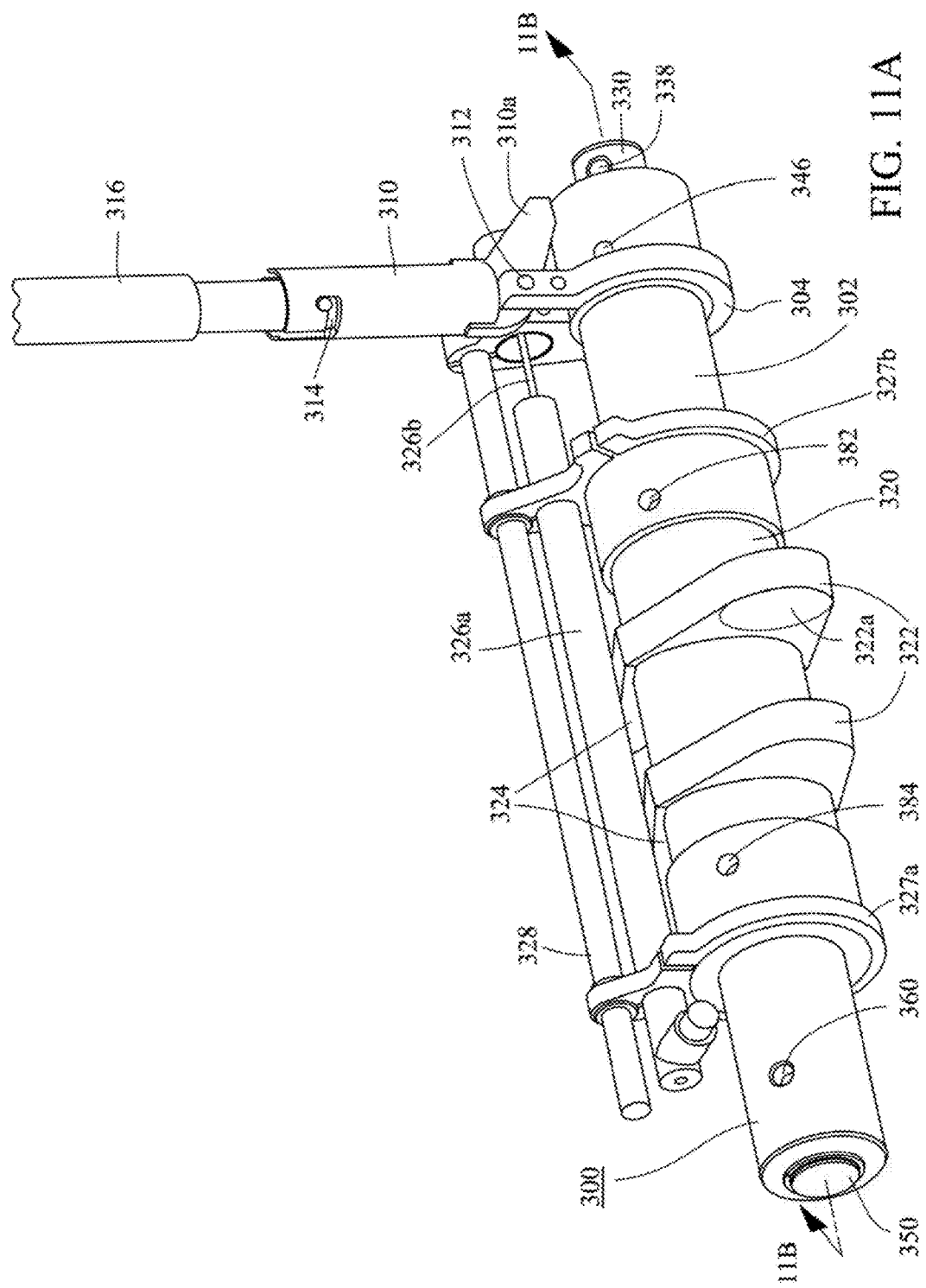
FIG. 11A depicts in schematic form an isometric view of a mixer adjustment tool employed to implement a step of the method illustrated by the flow chart of FIG. 6.
Figure 11B:
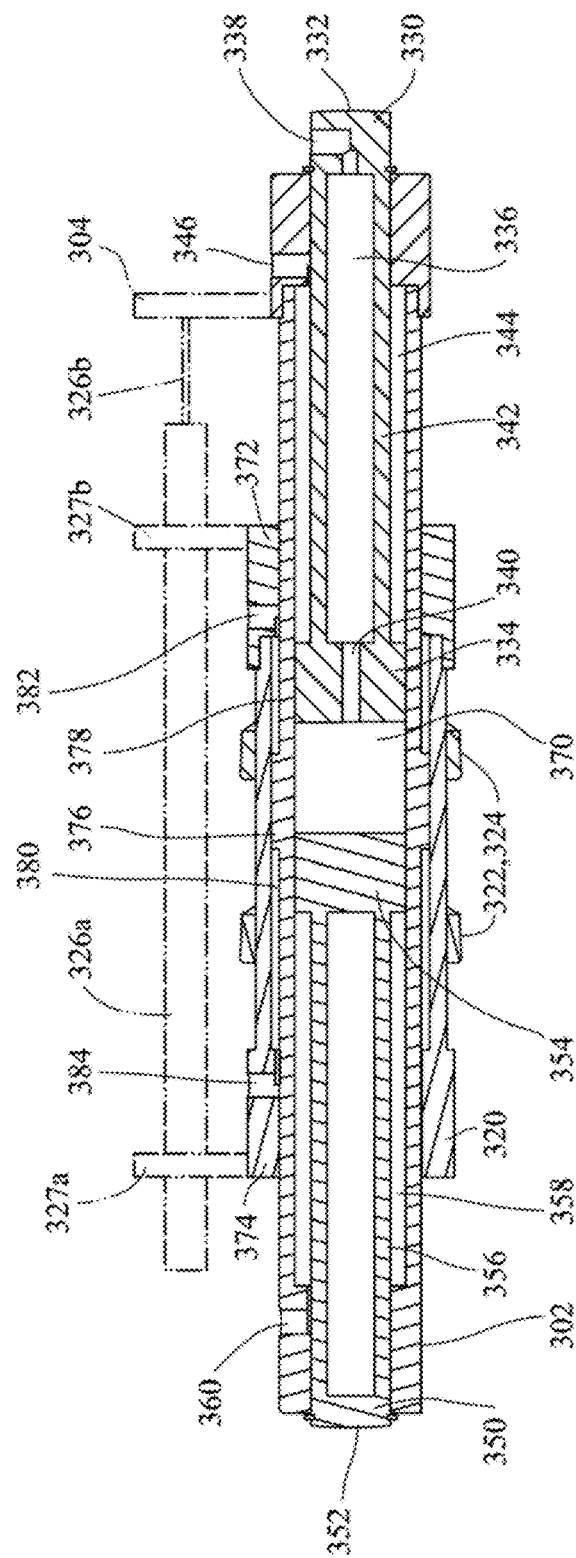
FIG. 11B is a sectional view taken in the plane of lines 11B-11B in FIG. 11A.

FIG. 11 illustrates a schematic version of a tool 300 suitable for use as a mixer adjustment device that can apply the side load SF to the lifting eye 69 and at the same time measure its displacement. FIG. 11A is a schematic isometric view of the tool 300, and FIG. 11B is a sectional view taken at the plane of the lines 11B-11B in FIG. 11A. In a manner described in detail just below, the tool 300 is lowered into position in the annular region 52 between the RPV side wall 14 and the core shroud 50 when the RPV top head 22 is removed. (See FIG. 1.) The tool 300 includes a hollow cylindrical outer structural member in the form of a shell 302 having a holding bracket 304 rigidly attached proximate to one end. (Hardware items such as fasteners and the like are generally omitted from FIGS. 11A and 11B for the sake of clarity, it being well within the ability of those skilled in the art to construct the tool 300 to perform its intended functions from the description herein.) A support socket 310 is attached to the holding bracket 304 at a pivot point 312. The support socket has a bayonet mount 314 that accepts a complimentary bayonet mount on a positioning rod 316. The positioning rod is used to lower the tool 300 into position in the annular region 52. Lowering the tool from the top of the RPV can be facilitated by rotating the structural shell 302 upward about the pivot point 312 so that it lies adjacent to the rod 316, and holding it there with a rope or other means as the tool is lowered into the vicinity of the mixer lifting eye. Releasing the rope enables the tool to drop into the position shown in FIG. 11A. A tab 310a on the support socket 310 holds the cantilever-suspended structural shell 302 in a horizontal orientation to permit the tool to be positioned relative to the mixer lifting eye.

An actuating member 320 slides on the outer surface of the structural shell 302 and includes a first set of ears 322 on one side and a substantially identical second set of ears 324 on the other side diametrically opposed to the first pair. (The second pair of ears 324 is only partially visible in the drawings.) When the tool 300 is in place at the jet pump, a mixer lifting eye is captured between a set of the ears to move the mixer lifting eye as the actuating member is moved along the structural shell by hydraulic pressure, as described below. Each ear thus comprises a positioning member that can adjust the position of the mixer. A linear variable differential transformer (LVDT) 326 is connected between the holding bracket 304 and the actuating member 320 to indicate the linear displacement of the ears 322, 324, and thus the mixer lifting eye, by the actuating member 320. The LVDT housing 326a is mounted to the mixer actuating member 320 by LVDT brackets 327a and 327b at respective ends of the actuating member. The brackets 327a and 327b are slidably mounted to a support rod 328 having and end thereof rigidly mounted to the holding bracket 304, to which the LVDT actuating rod 326b is also mounted. The LVDT outputs an electrical signal indicative of a distance traveled by the actuating rod 326b relative to the housing 326a.

FIG. 11B illustrates the operation of the mixer adjustment tool 300. The outer structural shell 302 has disposed therein a hollow first anchoring member comprising a rod 330 with an external end 332, which extends axially from a first end of the shell 302, and an internal end 334, which is disposed within the shell 302 for sliding movement relative thereto. An internal cavity 336 bounded by the rod ends 332, 334 is in fluid communication with an external hydraulic port 338 at the rod's external end 332 and with a hydraulic passage 340 through the rod's internal end 334. The first anchoring rod 330 has a reduced diameter portion 342 that forms a volume 344 between the inside of the support shell 302 and the reduced diameter portion 342. A hydraulic port 346 is in fluid communication with the volume 344. The outer shell 302 also has disposed therein a second anchoring member comprising a rod 350 with a blind external end 352 and a blind internal end 354 mounted within the shell 302 for sliding movement relative thereto. The second anchoring rod 350 has a reduced diameter portion 356 that forms a volume 358 between the inside of the support shell 302 and the reduced diameter portion 356. A hydraulic port 360 is in fluid communication with the volume 358. Thus, hydraulic pressure introduced at the port 338 pressurizes a central chamber 370 and extends the first and second anchoring rods 330 and 350 outwardly from the structural shell 302. By the same token, hydraulic pressure introduced to the port 346 retracts the first anchoring rod 330 into the shell 302, and hydraulic pressure introduced to the port 360 retracts the second anchoring rod 350 into the shell 302.

In operation, the tool is lowered from above into the annular region 52 using the positioning rod 316 and maneuvered beside a jet pump mixer elbow so that one of the sets of the ears captures between them the jet pump's mixer lifting eye 69. The ears 322, 334 have rounded protrusions 322a on their facing surfaces push on the mixer lifting eye near where it attaches to the mixer elbow to allow for the change in angle as the mixer is rotated. (An alternate embodiment of the tool can have supports on both ends and be lowered into position using a rope or cable.) The anchoring rods 330 and 350, which were slightly retracted to permit positioning of the tool 300, are extended into contact with the core shroud 50 and the RPV side wall 14 to secure the tool in place radially of the reactor core 24. The ears are slightly canted from normal to the actuating member to account for the circumferential spacing between the tool 300 and the mixer lifting eye 69 when the tool is in its final position (see FIGS. 1 and 3). Either before or after the tool 300 is thus positioned for operation, the beam bolt 96 (FIG. 3) is loosened to enable the tool to move the lifting eye in accordance with the description that follows below in connection with FIG. 12. Referring to FIG. 11B, the inner diameter of the actuating member 320 is larger than the outer diameter of the structural shell 302 to form an annular volume extending between end bosses 372 and 374 of the actuating member 320. The outer surface of the structural shell has a raised central land 376 with a diameter that matches the internal diameter of the actuating member to divide the annular volume into a first actuating chamber 378 and a second actuating chamber 380. The end bosses 372, 374 support the actuating member for sliding motion along the structural shell 302 in one direction or the other. A hydraulic port 382 in the end boss 372 is in fluid communication with the actuating chamber 378 and a hydraulic port 384 in the end boss 374 is in fluid communication with the actuating chamber 380. The actuating member 320 is thus forced to the right as seen in FIG. 11B by introducing hydraulic pressure to the port 382 and to the left by introducing hydraulic pressure to the port 384.

Conventional electronics (not shown) control the introduction of hydraulic fluid through suitable tubing (also not shown) to the various ports described above to apply a known side load SF to the lifting eye and use the LDVT 326 to measure the lifting eye displacement from the initial position. The hydraulic fluid is usually water to avoid contaminating the RPV in the event of leaks. Alternatively, all of the actuating components can use air as the actuating medium. Typically, wiring (not shown) attached to the tool and introduced with it into the annular region communicates electrical signals from the tool to the control electronics. It will be well within the ability of one of ordinary skill in the art to implement the necessary control and measurement using conventional engineering principles and techniques. Those skilled in the art will appreciate that the introduction of hydraulic fluid can be under manual control to the same effect.

2. Using the Tool 300 to Effect Method Step S110

Figure 12:
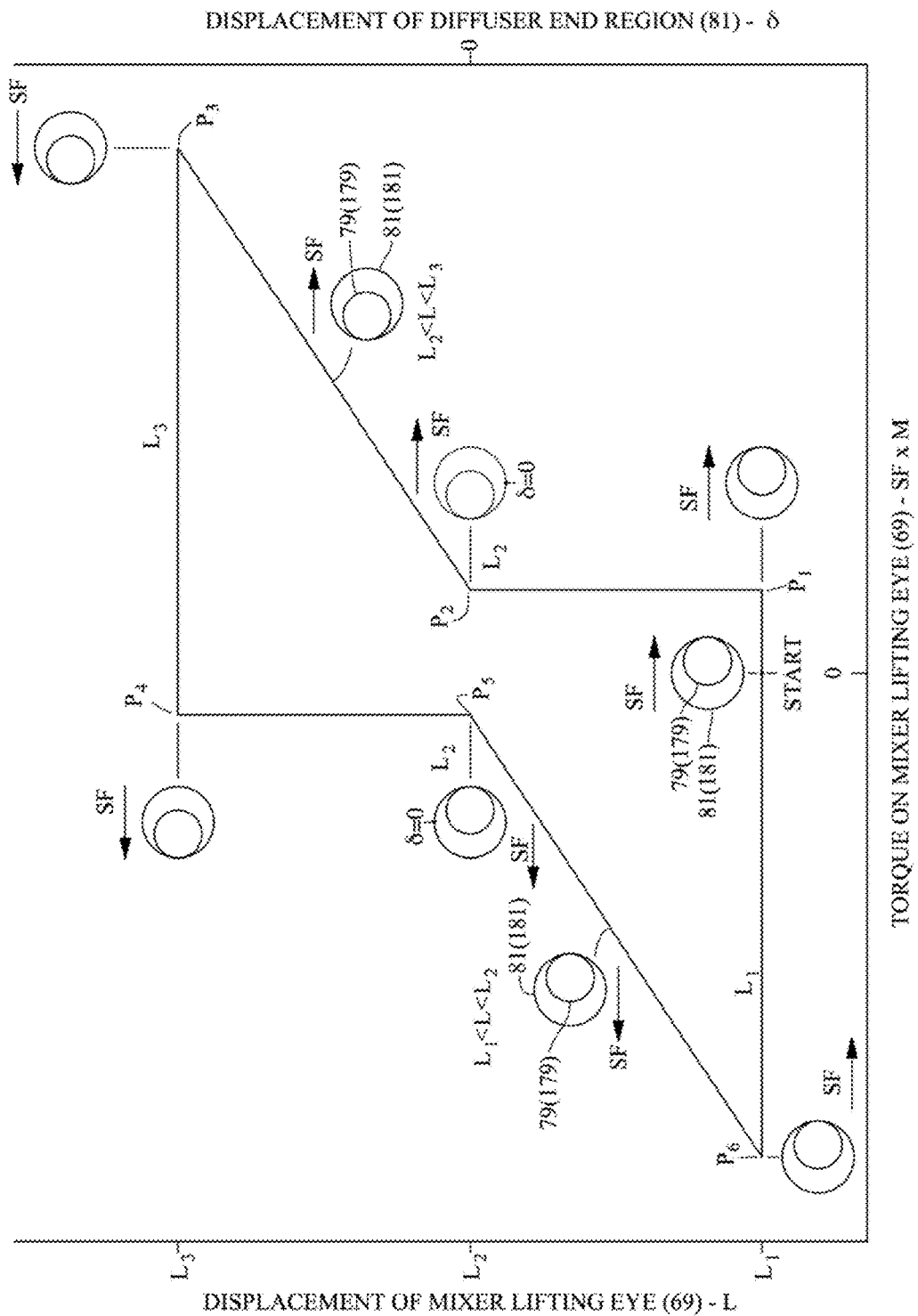
FIG. 12 is a graph that illustrates the results of the method step implemented using the tool depicted in FIG. 10.

FIG. 12 plots the displacement L of the mixer lifting eye 69 of the jet pump under consideration vs. the torque applied to the lifting eye 69 by the tool 300. FIGS. 7-9 illustrate the parameters used in generating the plot shown in FIG. 12. In this embodiment, the torque applied to the lifting eye 69 by the tool 300 is the product of the side load SF and the moment arm through which it acts on the mixer eye. As seen in FIG. 7B, the moment arm M is taken as the distance between (a) the fluid duct centerline $CL_{FD}$, about which the mixer elbow rotates on the spherical surface 234 (FIG. 10), and (b) the centerline $CL_{LE}$ of the lifting eye opening 69a where the tool bearing pads 314a and 314b exert the side load SF on the lifting eye (FIG. 11). The torque on the lifting eye is the abscissa in the plot in FIG. 12. The distance L by which the lifting eye is displaced is measured in the direction shown in FIGS. 7B and 8B. It will be appreciated as the present description proceeds that the positive direction of L is arbitrarily chosen in the direction of the arrow L in the figures, and that the salient measurement is the difference in L from one position of the lifting eye to the next and the direction of its displacement. It will also be appreciated that displacing the lifting eye in the direction +L exerts a force on the diffuser 80 in the opposite direction about the fulcrum provided by the restrainer bracket RB (220). In the present description, the chosen convention considers the diffuser to deform in a +δ direction as the lifting eye is displaced in the +L direction. If the diffuser is undeformed by the mixer, δ=0. (See FIGS. 7 and 8.) The small sketches associated with various points on the plot in FIG. 12 indicate the positions (L) of the lifting eye and the relative locations of the mixer end region 79 (179) and the diffuser top region 81 (181).

The plot in FIG. 12 assumes that the mixer and diffuser are already in contact, with the mixer eye at a position $L_1$ and the diffuser deflected in the −δ direction. This point on the plot is labeled START, and there is no torque on the lifting eye (SF=0). The mixer end region 79 (179) bears against the diffuser top region 81 (181) with friction holding it against the spring force generated by the deflection of the diffuser described above in connection with FIG. 7. This mixer/diffuser position is indicated by the small figure at this point on the plot. In this position the side load SF is applied by the tool 300 in the direction shown in FIG. 12 to unload the diffuser 80. That is, the end region of the mixer is being forced to the left as seen by the small circles in FIG. 12 by the side load SF applied to the mixer lifting eye in the opposite direction. As the side load SF applied in this direction by the tool increases, the torque (SF×M) also increases, as seen in FIG. 12. Due to friction on the mixer at multiple sites (the transition piece, the restrainer bracket, and the diffuser), the diffuser and the mixer do not move initially as the torque on the lifting eye 69 increases. When the torque on the lifting eye reaches a particular value represented by a point $P_1$ the friction is overcome, at which point the mixer begins unloading the diffuser and they separate. The diffuser moves to its neutral position (δ=0) with proportional movement of the lifting eye. This is represented in the FIG. 12 plot as a vertical line between the point $P_1$ and a point $P_2$ as the lifting eye moves toward the position $L_2$, although the line actually will have a small slope because of the small change in the loading between the points $P_1$ and $P_2$.

At the point $P_2$ the mixer contacts the diffuser again and begins to deflect it in the +δ direction as the torque on the lifting eye continues to increase by the application of an increasing side load in the direction of the arrow SF associated with point $P_2$ in FIG. 12. In the portion of the plot between the point $P_2$ and a point $P_3$, the diffuser is further deflected as increasing torque is applied to the lifting eye, with the slope of the plot between points $P_2$ and $P_3$ reflecting the spring constant of the "springs" 180a-180d that model the stiffness of the diffuser as described above in connection with FIG. 7. The mixer position $L_3$ at the point $P_3$ reflects the diffuser displacement δ required to exert a force approximately equal to or somewhat in excess of the cold-condition transverse load required for FIV suppression, as determined in conjunction with steps S102 and S104. The direction of the side load is then reversed, as indicated by the arrow SF associated with the point $P_3$. The torque (applied by the side load SF) decreases, again with minimal movement of the mixer and diffuser because of friction, and may not actually move until the torque reaches a particular value represented by a point $P_4$ where the friction is overcome. The mixer begins unloading the diffuser without a significant increase in the torque applied to the mixer lifting eye (as described above), until the diffuser moves to its neutral position (δ=0). The mixer continues moving until it contacts the opposite side of the diffuser. This is represented in the FIG. 12 plot as a vertical line between the point $P_4$ and a point $P_5$ at lifting eye position $L_2$ although as noted above the part of the plot in reality will have a small slope.

At the point $P_5$ the mixer contacts the diffuser again and begins to deflect it in the −δ direction as the torque on the lifting eye continues to increase by the application of an increasing side load in the direction of the arrow SF associated with point $P_5$ in FIG. 12. In the portion of the plot between the point $P_5$ and a point $P_6$, the diffuser is further deflected as increasing torque is applied to the lifting eye, with the slope of the plot between points $P_5$ and $P_6$ also reflecting the stiffness of the diffuser as represented by the spring constant of the "springs" 180a-180d described above in connection with FIG. 7. (Note that the plot in FIG. 12 assumes that the spring constant is the same in all directions of deflection, which will be the case for most jet pump installations.) The lifting eye position returns to $L_1$ at the point $P_6$, where the direction of the side load SF is reversed and the actuators 306a and 306b are returned to the START position. As before, the lifting eye does not actually change position after the point $P_6$ because of the friction between the mixer and diffuser. It will be appreciated that this plot is a characteristic of the particular jet pump to which the step S110 is applied. In other words, the plot would have essentially the same shape if the mixer and diffuser were in a different relative position when the tool 300 was clamped in place for operation. The plot represented in FIG. 12 is also independent of the initial direction in which the side load SF is applied to the mixer lifting eye.

Alternate approach A uses the algorithm represented by the plot in FIG. 12 to apply a transverse load between the mixer and diffuser at the slip joint by using the tool 300 to move the mixer lifting eye 69 to a position that causes the diffuser to deflect the appropriate amount and in the appropriate direction to provide a cold-condition contact load that will suppress the onset of FIV under operating conditions. More specifically, the results of the tests performed in the step S102 determine the relationship between the operating-condition transverse contact load and onset SJDP. The transverse mixer/diffuser side load is chosen in accordance with the most severe SJDP that the reactor will encounter during operation. Likewise, the step S104 determines the relationship between the transverse contact load at cold conditions and at operating conditions. The mixer lifting eye is then moved to deflect the diffuser so that the cold-condition mixer/diffuser transverse contact load will result in an operating-condition transverse contact load sufficient to suppress FIV at all reactor operating conditions.

The deflection of the end region 79 of the mixer relative to the displacement of the mixer lifting eye can be determined in a variety of ways. One preferred method is to empirically determine this relationship using the full-scale operational jet pump mock-up used for the tests described in connection with the step S102. Another way would use the geometric relationship of the distances of the lever arms along the axis RA (FIG. 9) between the mixer lifting eye 69 and the restrainer bracket RB and between the restrainer bracket and the top end of the diffuser. A still further alternative would be to model mathematically, for example, via a separate FEM analysis, the relationship between movement of the mixer lifting eye and the displacement of the mixer end region for the actual jet pump installed in the reactor.

Additional details of the manner in which the algorithm represented by FIG. 12 is created and applied, and the principles employed in implementing same to effect certain aspects of the methods claimed herein, are contained in U.S. provisional applications No. 61/852,834, filed Mar. 22, 2013, and No. 61/853,608, filed Apr. 9, 2013. For example, the '834 provisional application includes further discussion of certain aspects of jet pump geometry and construction employed in realizing the methods claimed herein, and the '608 provisional application includes additional discussion of certain principles underlying the methods claimed herein. Those discussions in both provisional applications are specifically incorporated herein by reference.

3. Working Examples of Method Step S110

Initially, it should be noted that the tool 300 rotates the mixer lifting eye 69 in a direction that displaces the mixer end region 78 (see FIG. 4) in a radial direction relative to the RPV. This can be appreciated from the view of the jet pump assembly JPA in FIG. 2. Accordingly, in this embodiment of the method, and in the working examples described here, the mixer end region is moved only radially inwardly or radially outwardly. By the same token, it should also be appreciated that the spherical end region 236 of the mixer elbow 68 (see FIG. 10) enables the mixer elbow, and thus the mixer itself, to be rotated about any axis to displace the mixer end region in any desired direction. In addition, movement of the mixer to effect alternate approach A can be accomplished by directly applying a torque rather applying a linear force such as side load SF to the mixer lifting eye. For example, suitable tooling (not shown) could be used to apply torque to the transition piece 66 or to the riser pipe 60. However, the application of a side load SF on the mixer lifting eye is a preferred manner of moving the mixer end region 69 into a desired position because the geometry of the mixer elbow provides a substantial moment arm M through which the side load SF can act (see FIG. 7) to apply the necessary torque. Alternate ways of placing the mixer and diffuser in desired positions in the cold condition are also possible and are discussed further below.

It should further be appreciated that the mixer elbow generally requires a relatively small amount of movement to place the mixer end region in a desired position in accordance with the methods described herein. For example, the displacement of the mixer lifting eye necessary to move the mixer end region the desired distance in accordance with the methods described herein is generally on the order of one to two inches. (Thus, it will likewise be appreciated that the displacement of the diffuser 180 modeled in FIG. 8B is also exaggerated for purposes of illustration.) Accordingly, the operation of the jet pump, and the seal between the mixer elbow and the transition piece, are not affected by implementation of the present invention.

Working Example 1

In this example, assume that the tests in accordance with step S102 indicate that the most severe reactor operating conditions result in an onset SJDP that requires a transverse mixer/diffuser contact load of 500 lbs. in a direction normal to the RPV axis. In addition, assume that the FEM/CFD analysis of the step S104 indicates that going from cold conditions (with the diffuser undeflected) to operating conditions moves the mixer and diffuser such that a 100 pound transverse load is applied radially outward (toward the vessel wall) on the diffuser. Therefore, in the cold conditions the mixer lifting eye could be moved radially inwardly a sufficient distance to deflect the diffuser radially outward to add 400 pounds of transverse load to the diffuser, thereby to exert a transverse side load on the diffuser of 500 pounds under operating conditions. Furthermore, assume from test data it is known that moving the lifting eye one inch moves the end region 79 of the mixer 0.1 inch, and that the diffuser has a stiffness of 10,000 lbs./inch (meaning that moving the lifting eye one inch, and neglecting the effect of the slip joint gap, will change the transverse load between the mixer and diffuser by 1,000 lbs.).

The algorithm represented by the plot in FIG. 12 is used to move the mixer lifting eye 69 to achieve a diffuser displacement $\delta$ that will result in a 500 lb. mixer/diffuser transverse contact load at the slip joint under operating conditions. In that regard, the point $L_2$ is found on the curve, which corresponds to a mixer and diffuser without a transverse load. Assuming that the motion from $L_2$ to $L_3$ moves the mixer lifting eye radially inwardly, with the above numbers the lifting eye would be moved 0.4 Inches from $L_2$ toward $L_3$. The lifting eye would be held in that position by the tool 300 and the process would proceed to step S112 where the jet pump beam is retightened to hold the mixer in place and the tool 300 is removed. This particular jet pump is now set to a position that is not susceptible to FIV.

Working Example 2

In working example 1, the lifting eye could also be moved radially outwardly to move the diffuser radially inwardly, thus adding 600 pounds of transverse load to the diffuser. For this example, a 600 pound transverse load is needed because the load resulting from going to operating conditions would reduce the initial load by 100 pounds. In this case the lifting eye (following FIG. 12) would be moved from $L_2$ toward $L_1$ a distance of 0.6 inches and then held in position by the tool 300 while the jet pump beam is retightened to hold the mixer in place. The tool 300 is then removed and the jet pump is set to a position that is not susceptible to FIV.

Working Example 3

In this example, assume that the step S102 indicates that the onset SJDP requires a transverse mixer/diffuser transverse contact load of 700 lbs. In addition, assume that the FEM/CFD analysis of the step S104 indicates that going from cold conditions to operating conditions moves the mixer and diffuser such that a 300 pound transverse load is applied tangentially (toward the riser pipe) on the diffuser. Therefore, in the cold condition the lifting eye could be moved radially inward to push the diffuser radially outward to add 632 pounds of transverse load to the diffuser. The vector sum of the 300 pound transverse load from heat up and the 632 pound cold load applied to the diffuser will produce a 700 pound ($[632^2+300^2]^{1/2}$) transverse contact load between the mixer and diffuser. Furthermore, as in working example 1, it is known that moving the lifting eye one inch results in the end region of the mixer moving 0.1 inch. Also as before, it is know that the diffuser stiffness is 10,000 lbs./inch. Therefore, moving the lifting eye one inch (neglecting the slip joint gap) will change the transverse load between the mixer and diffuser by 1,000 pounds. The algorithm represented by the plot in FIG. 12 is used to move the mixer lifting eye 69 to achieve a diffuser displacement δ that will result in a 700 pound mixer/diffuser transverse contact load at the slip joint under operating conditions. The point $L_2$ is found on the curve which corresponds to a mixer and diffuser without a transverse load. The motion from $L_2$ to $L_3$ is assumed to be moving the lifting eye radially inward and given the above numbers the lifting eye would by moved 0.632 inches from $L_2$ toward $L_3$. The lifting eye would be moved 0.632 inches from $L_2$ in the direction toward $L_3$ and then held in position by the tool 300. The jet pump beam is then tightened to hold the mixer in place and tool 300 is removed. The jet pump is then set to a position that is not susceptible to FIV. More conservatively, the mixer lifting eye could be moved to apply 700 pound load in the radial direction and neglect the tangential load due to the change to operating conditions.

Summary.

It will be appreciated that the object of moving the mixer lifting eye is to establish a cold-condition transverse contact load between the mixer and diffuser that will result in an operating-condition transverse contact load at least as great as the highest contact load correlating to onset SJDP that the jet pump will encounter, as determined by the tests described in connection with step S102.

4. Finishing Alternate Approach A

As noted above, after the mixer elbow of one jet pump has been moved to the desired position by the tool 300, the jet pump beam bolt 96 (see FIG. 3) is retightened in step S112. The tool is removed from that jet pump mixer lifting eye by retracting the anchoring rods 330 and 350 to enable the tool to be positioned to apply the method to another jet pump. By having two sets of the ears 322, 324 at diametrically opposed locations on the structural shell, the tool can be positioned for application of the method to both jet pumps of a jet pump assembly (see FIG. 3) without requiring the tool to be rotated. The step S110 is applied to all of the jet pumps in the reactor and the tool is removed from the RPV 14 and the reactor is ready for operation.

B. Alternate Approach B

As noted above, the method depicted in FIG. 6 also provides an alternate approach B represented by the steps S114 and S116. As before, the RPV top head 22 has been removed to permit access to the jet pumps (see FIG. 1). The step S114 measures the direction and magnitude of the actual mixer/diffuser transverse contact load at the slip joint, using a specially designed tool 400 described below in connection with FIG. 13. The concept underlying this approach B is that if the mixer and diffuser are already positioned under cold conditions such that the mixer/diffuser transverse contact load is sufficient for FIV suppression, per the results of the steps S102 and S104, then no further action need be taken. Thus, if the decision at the step S116 is YES, then the step S112 involves applying the method to the next jet pump in the reactor.

However, if the decision at the step S116 is NO for any particular jet pump in the reactor, the method proceeds to the step S110, described above. In this case, the tool 400 is removed and the tool 300 is put into place as discussed above to move the mixer an appropriate distance in accordance with the discussion above in connection with alternate approach A. The finishing step S112 is in this case the same as described above in connection with alternate approach A. It will be appreciated that the decision at the step S108 to choose alternate approach A or B depends on the preference of the operator of the reactor. One example of a reason to apply alternate approach B to a given jet pump would be the maintenance history of the jet pump. For example, if a particular jet pump has not in the past been susceptible to FIV, the reactor operator might choose alternate approach B to avoid loosening the jet pump beam as in alternate approach A.

1. Embodiment of an Apparatus for Effecting Method Step S114

Figure 13:
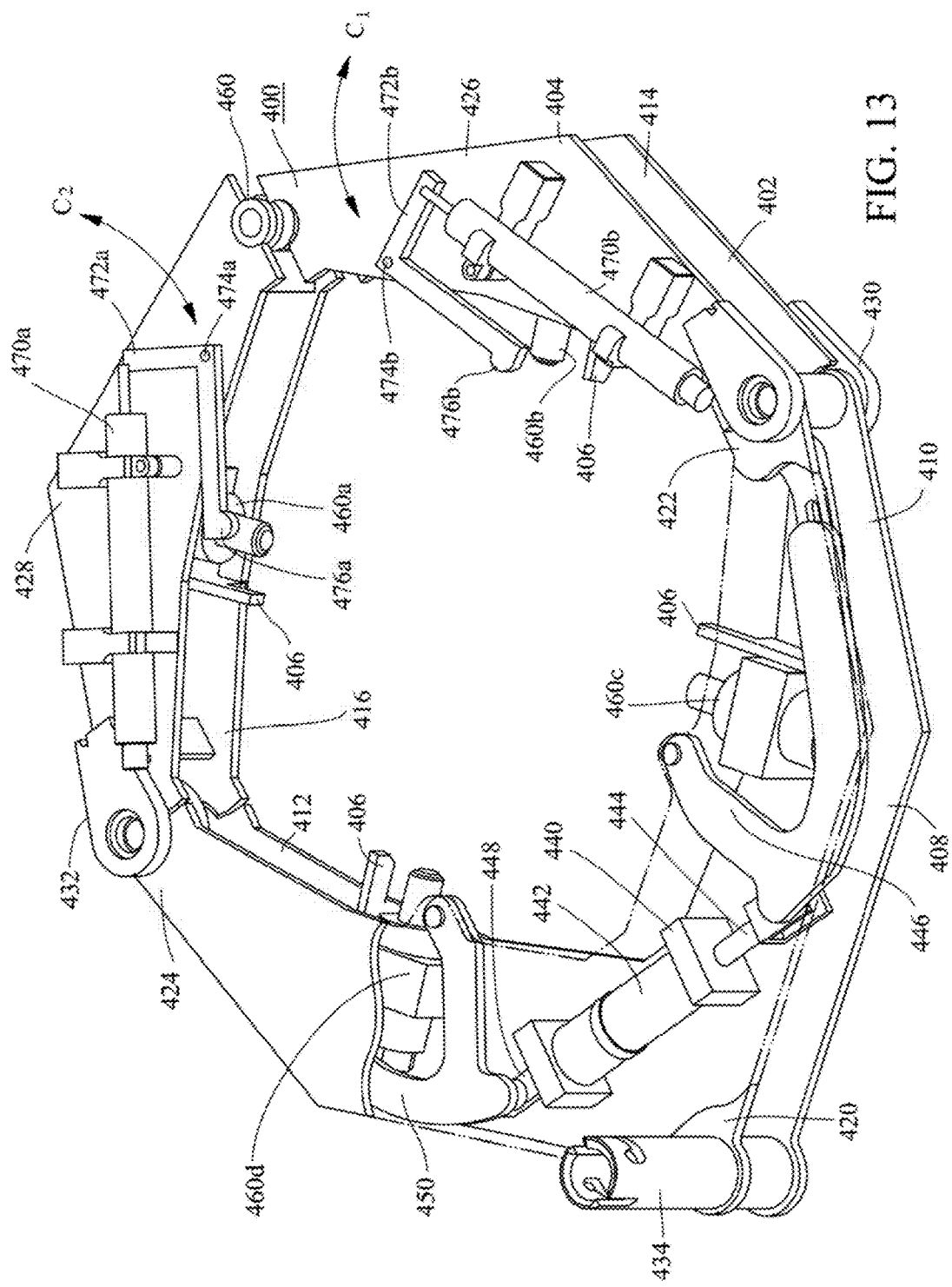
FIG. 13 depicts in schematic form a partially cut away isometric view of a contact load measuring tool that can be employed to implement another step of the method illustrated by the flow chart of FIG. 6.

FIG. 13 schematically illustrates a tool 400 that is used to measure the actual direction and magnitude of the mixer/diffuser transverse contact load under cold conditions. The tool 400 includes a lower diffuser ring 402 and an upper mixer ring 404 rigidly connected together with struts 406 connected to the diffuser ring 402 interposed between the two rings. The lower diffuser ring 402 includes a diffuser ring base plate 408 in the shape of a "U" with leg portions 410 and 412. Proximal ends of diffuser ring jaws 414 and 416 are pivotally mounted to the ends of the leg portions 410 and 412, respectively. The upper mixer ring 404 is similarly constructed, with a mixer ring base plate 420 in the shape of a "U" with leg portions 422 and 424. Proximal ends of mixer ring jaws 426 and 428 are pivotally mounted to the ends of the leg portions 422 and 424, respectively. The diffuser ring jaw 414 and the mixer ring jaw 426, which are rigidly connected together, are mounted to their corresponding base plate legs 410 and 422 by a common hinge 430 to enable the jaws to open and close in the directions of the arrow $C_1$. (As in the description of the tool 300 in connection with FIG. 11, hardware items such as fasteners and the like are generally omitted from FIG. 13 for the sake of clarity.) Likewise, the diffuser ring jaw 416 and the mixer ring jaw 428, which are rigidly connected together, are mounted to their corresponding base plate legs 412 and 424 by a common hinge 432 to enable the jaws to open and close in the directions of the arrow $C_2$. At the midpoint of the U-shaped base plates 408 and 420 an upstanding support socket 434 is rigidly connected to the base plates. The support socket 434 is similar to the support socket 310 on the tool 300 (FIG. 11), in that it has a bayonet mount that accepts a complimentary bayonet mount on a positioning rod used to lower the tool 400 into position where the mixer enters the diffuser at the slip joint (see FIG. 4).

Parts of the mixer base plate 420 are cut away and depicted in phantom lines in FIG. 13 to show various structure that resides in a space between the base plates 408 and 420. A linkage system 440 opens and closes the diffuser and mixer ring jaws in the directions of the arrows $C_1$ and $C_2$. The linkage system is operated by a hydraulic operating actuator 442 with a first piston 444 that controls a first linkage 446 connected to the diffuser/mixer ring jaw assembly 414, 426, and a cylinder body 448 that controls a second linkage 450 connected to the diffuser/mixer ring jaw assembly 416, 428. The operating actuator 442 closes the jaw assemblies (as seen in FIG. 13) around the diffuser and mixer at the slip joint. In this closed position, the lower diffuser ring 402 surrounds the diffuser top region 81, the inner periphery of the lower diffuser ring being squared off to fit around the diffuser guide ears 84 (see FIGS. 2 and 4). The struts 406 protrude radially inwardly a slight amount to rest on the top of the diffuser 80 so that the upper mixer ring 404 surrounds the mixer just above the top of the diffuser, its inner periphery also being squared off to fit around the diffuser guide ears 84. The distal ends of the jaw assemblies 414, 426 and 416, 418 are positively located relative to each other by a male-female stop device 460, and are held in place by a locking pin that is actuated by a hydraulic cylinder (not shown) where the jaws meet at the device 460. (For purposes of illustration, the jaw assemblies are slightly open in FIG. 13 without the locking pin inserted.) For placement and removal of the tool 400, the operating actuator 442 operates the linkage system 440 to open the jaw assemblies and enable them to be positioned around the diffuser and mixer.

The tool 400 further includes four hydraulic force actuators 460a, 460b, 460c, and 460d. These actuators are secured around the diffuser ring 402 and the mixer ring 404 at 90° intervals between the rings. Preferably, they are located at the midpoints of the more or less flattened regions that span the diffuser guide ears when the tool in is position. The actuating rods of the actuators 460a-460d are located relative to the struts 406 so that they contact the mixer outer surface when the struts are resting on the top of the diffuser. A first LVDT 470a is mounted to the top at the mixer ring jaw 428 and a second LVDT 470b is mounted to the top of the mixer ring jaw 426. The first LVDT 470a has attached thereto one end of a linkage 472a that is pivotally mounted at 474a to the mixer ring jaw 428. The other end of the linkage terminates at a contact tab 476a positioned to contact with the outside surface of the mixer at the circumferential location of the actuating rod of the actuator 460a. The second LVDT 470b is similarly constructed, with an attached linkage 472b that is pivotally mounted at 474b to the mixer ring jaw 426 and a contact tab 476b positioned to contact the outside surface of the mixer at the circumferential location of the actuating rod of the actuator 460b. The LVDTs are spring loaded so that their contact tabs are held in contact with the mixer outside surface when the jaw assemblies 414, 426 and 416, 428 are in their closed positions.

As with the tool 300, conventional electronics (not shown) control the introduction of hydraulic fluid through suitable tubing (also not shown) to the various hydraulic actuators of the tool 400. In the case of the force actuators, they are used to apply known lateral forces to the top of the mixer, and the LDVTs measure the mixer lateral displacement from their position when the tool 400 was first positioned as described above. Typically, wiring (not shown) attached to the tool and introduced with it into slip joint region communicates electrical signals from the tool to the control electronics. As in the case of the operation of the tool 300, it will be well within the ability of one of ordinary skill in the art to implement the necessary control and measurement for implementation of the tool 400 using conventional engineering principles and techniques. Those skilled in the art will appreciate that the introduction of hydraulic fluid can be under manual control to the same effect.

2. Working Examples of Alternate Approach B

In operation, the tool 400 is lowered to the vicinity of the slip joint with the jaws open, and then closing the jaws around the mixer and locking them into position, and finally setting the struts 406 on the top of the diffuser with the tool 400 oriented on the guide ears 84 as noted above. The force actuators 460a-460d are then used to apply forces around the mixer and electrical signals output by the LVDTs 470a and 470b through the motion of the linkages 472a and 472b indicate any mixer motion concomitant with the application of the forces by the actuators. When a sufficient force is applied in a given direction that causes the mixer to move relative to the diffuser, the transverse contact force magnitude and direction is determined by knowing the magnitude of the applied force that produces the largest motion. The largest motion occurs when the force is directed at the point of contact between the mixer and diffuser and the diffuser or mixer moves across the entire clearance of the slip joint gap. A force applied directly opposite this point of contact will only increase the contact load; it will not produce any relative motion of the mixer and diffuser. Typically, the direction and magnitude of the transverse contact force is unknown and forces are applied between the mixer and diffuser by the force actuators operated in a suitable sequence to find the direction and magnitude of the contact force.

An exemplary technique would start with the force actuator 460a and increase the force from zero to the maximum available. Then, the force actuators 460a and 460b would be used in combination to develop a force 5° away from actuator 460a by applying approximately 8.8 pounds of force with the actuator 460b for every 100 pounds of force applied by the actuator 460a ($\tan^{-1}$ [8.8/100]=5°). (The 5° increment discussed here is used only as an example and other increments can be used depending on the accuracy required by a particular reactor installation.) If there was still no motion, then a force at 10° from the actuator 460a could be developed by applying 17.6 pounds of force on the actuator 460b for every 100 pounds force on the actuator 460a. Any direction can be obtained as a vector sum of the force applied by the force actuators. It will be appreciated by those skilled in the art that any number of force actuators greater than two that push against the mixer can be used for the application of this technique for determining the cold transverse contact load in accordance with the step S114 in FIG. 6. If force actuators that can push and pull on the mixer, only two are needed. Alternatively, a single force actuator can be used if it can be moved around the slip joint. Note also that it is sufficient to simply show that the magnitude of the contact load is equal to or exceeds the value required to suppress FIV without determining the magnitude of the contact load or the point of contact.

Working Example 1

In this example, assume that the tests in accordance with the step S102 indicate that the most severe reactor operating conditions result in an onset SJDP that requires a transverse mixer/diffuser contact load of 500 lbs. in a direction normal to the RPV axis. In addition, assume that the FEM/CFD analysis of the step S104 indicates that going from cold conditions (with the diffuser undeflected) to operating conditions moves the mixer and diffuser such that a 100 pound transverse contact load is applied radially outward (toward the vessel wall) on the diffuser. Therefore, the tool 400 needs to detect a force of 400 pounds radially outward, a force of 600 pounds radially inward, or force of ($[500^2-100^2]^{1/2}$) ≈490 pounds in the circumferential direction. (A more conservative application could use 500 pounds.) Note that a force in a different direction could be computed as the vector sum of the force from the change to operating conditions and the measured transverse contact load. In that case the tool 400 applies a force between the mixer and diffuser with partial results shown in Table 1:

TABLE 1

| Direction (deg. from radially outward) | Force (lbs.) | Displacement (in.) |
| --- | --- | --- |
| −15° | 100 | .002 |
| −10° | 200 | .004 |
| −5° | 350 | .007 |
| 0° | 550 | .011 |
| 5° | 350 | .006 |

TABLE 1-continued

| Direction (deg. from radially outward) | Force (lbs.) | Displacement (in.) |
|---|---|---|
| 10° | 200 | .004 |
| 15° | 100 | .002 |

Table 1 shows that the maximum motion occurs in the radially outward direction, which means the maximum transverse contact load between the mixer and the diffuser is the radially outward direction. Since the measured cold condition transverse contact load of 550 pounds is greater than the required 400 pounds of radially outward contact load, this jet pump is not susceptible to FIV and does not need any adjustment or fixes to prevent FIV damage.

Working Example 2

For this example consider the same conditions as example 1. Assume that the tests in accordance with the step S102 indicate that the most severe reactor operating conditions result in an onset SJDP that requires a transverse mixer/diffuser contact load of 500 lbs. in a direction normal to the RPV axis. In addition, assume that the FEM/CFD analysis of the step S104 indicates that going from cold conditions (with the diffuser undeflected) to operating conditions moves the mixer and diffuser such that a 100 pound transverse load is applied radially outward (toward the vessel wall) on the diffuser. In this case the measurements from tool 400 are shown in Table 2:

TABLE 2

| Direction (deg. from radially outward) | Force (lbs.) | Displacement (in.) |
|---|---|---|
| 75° | 800 | .001 |
| 80° | 700 | .004 |
| 85° | 600 | .008 |
| 90° | 500 | .012 |
| 95° | 600 | .008 |
| 100° | 700 | .004 |
| 105° | 800 | .002 |

Table 2 shows that the maximum displacement occurs at 90° to the radial direction and that the contact force is 500 pounds. This force is greater than the 490 pounds of force that is needed to suppress FIV in the worst case conditions and therefore this jet pump is not susceptible to vibration. Note that if the force and displacement were measured at 270°, the force would be the maximum the tool could apply and the deflection would be zero.

Working Example 3

For this example consider the same conditions as example 1. Assume that the tests in accordance with the step S102 indicate that the most severe reactor operating conditions result in an onset SJDP that requires a transverse mixer/diffuser contact load of 500 lbs. In a direction normal to the RPV axis. In addition, assume that the FEM/CFD analysis of the step S104 indicates that going from cold conditions (with the diffuser undeflected) to operating conditions moves the mixer and diffuser such that a 100 pound transverse load is applied radially outward (toward the vessel wall) on the diffuser. In this case the measurements from tool 400 are shown in Table 3:

TABLE 3

| Direction (deg. from radially outward) | Force (lbs.) | Displacement (in.) |
|---|---|---|
| 165° | 800 | .003 |
| 170° | 700 | .006 |
| 175° | 600 | .009 |
| 180° | 500 | .013 |
| 185° | 600 | .008 |
| 180° | 700 | .005 |
| 175° | 800 | .002 |

In this case the maximum displacement occurs at 180° (it would be zero at 0°) and the contact force is 500 pounds. However, because the change from cold to operating conditions would reduce this load by 100 pounds (step S104), a 600 pound contact load is required. This jet pump is susceptible to FIV and alternate approach A should be applied to rotate the mixer to increase the contact load to prevent potential FIV damage.

C. Determining Relation Between FIV Onset and Slip Joint Contact Loads

The tests for effecting the step S102 are, as noted, preferably carried out using a full-scale operational mock-up of a jet pump. The object of the tests is to determine the slip joint differential pressures (SJDP) at which FIV begins for given mixer/diffuser transverse contact loads under relevant operating conditions. By way of background, the contact force required to suppress FIV depends largely on the geometry of the slip joint region and the reactor operating parameters, the most important one usually being SJDP. This is what drives the flow through the slip joint and can cause flow induced vibration to occur. SJDP varies from reactor to reactor, and depends on many factors, among them being properties and the condition of the jet pumps themselves, including design, efficiency, and fouling, and reactor properties such as fuel design, time in the fuel cycle, and flow properties through the reactor core. SJDP is usually positive under normal operating conditions (meaning that the leakage flow LF is in the direction of the arrow in FIG. 4), but it can become negative under certain conditions, such as loss of one recirculation pump. There are jet pump designs that become susceptible to FIV under positive SJDP conditions and others that are susceptible to FIV under negative SJDP conditions. In either case, increasing the contact load between the mixer and diffuser during operation tends to suppress the onset of this vibration. As discussed, the methods described herein seek to place a sufficient transverse contact load between the mixer and diffuser that will suppress FIV throughout the SJDP range the reactor may experience.

The tests referred to in connection with the step S102 are conducted with a specific contact load applied to the mixer and diffuser and then the SJDP at which vibration begins is determined by varying the SJDP. Additional tests are conducted with different contact loads to determine the relationship between contact load and onset SJDP. Alternatively, the tests can be conducted at a specific SJDP while varying the contact load until vibration begins. One way to vary the transverse contact load for purposes of these tests is to pull on the diffuser with a spring that is soft relative to the stiffness of the diffuser. A soft spring will not significantly affect the diffuser dynamics, but will allow a force to be applied to deflect the diffuser such that it contacts and puts a transverse load on the mixer. The spring may be connected to the diffuser with a cable and the other end of the spring can be connected to an actuator (for example, a hydraulic actuator) which may be operated during a test to change the transverse contact load. The load can be measured by a load cell in the load path of the spring. The SJDP can be varied by varying the pressure drop downstream of the diffuser by adding, for example, a valve at the exit opening of the diffuser at the baffle plate 56. (See FIG. 2.) Modulating the valve opening will thus change the pressure at the exit of the diffuser and therefore will change SJDP. The SJDP can be measured by a differential pressure transducer connected from the slip joint to the pressure in the vessel surrounding the jet pump.

However, in an operating nuclear power plant SJDP is not typically measured directly, although it can be calculated. The total flow through the jet pump is the sum of the drive flow that flows through the nozzle 75 and the suction flow that is entrained through the suction inlet 74. (See FIG. 4.) A parameter known in the art as the "M-ratio," which is the suction mass flow divided by the drive mass flow, is linearly related to the SJDP (at a specific drive mass flow). Therefore, a plant may equivalently use M-ratio, by measuring the drive mass flow and use the known linear relationship with SJDP to determine SJDP. A plant may specify an M-ratio and drive flow condition at which FIV must be suppressed and apply this method rather than specify an equivalent SJDP. Similarly, other parameters may be used to determine the load required to utilize this method to suppress FIV. SJDP is described above because this parameter determines the flow through the slip joint for the given slip joint geometry and fluid properties, but one skilled in the art will recognize that other plant parameters may be used to determine the minimum transverse load required to suppress FIV for a particular application.

Although full scale testing (that is, using a full-scale operational jet pump mock-up) is preferred at prototypical reactor operating conditions (for example, at temperatures that simulate operational fluid viscosities and densities—or Reynolds numbers—and at pressures that prevent atypical cavitation phenomena), subscale testing or testing at non-prototypical conditions can be used to determine the conditions when FIV begins. If other than full-scale testing under actual reactor operating conditions is used, the results must be appropriately scaled to plant operating conditions. It will be appreciated that the relationship between onset SJDP and the mixer/diffuser transverse contact load can also be determined analytically, such as with a suitable CFD model of the flow in the slip joint region. It will be appreciated that certain structural characteristics of the jet pump may need to be included with this model to predict the structural response, or the CFD model may just predict the driving forces that cause the FIV. Typically, a CFD model would be validated against test data to confirm the validity of the model. That is, modeling jet pump instability by CFD analysis is complex and involves various assumptions that are preferably validated by experiment before relying on the CFD results.

Figure 14:
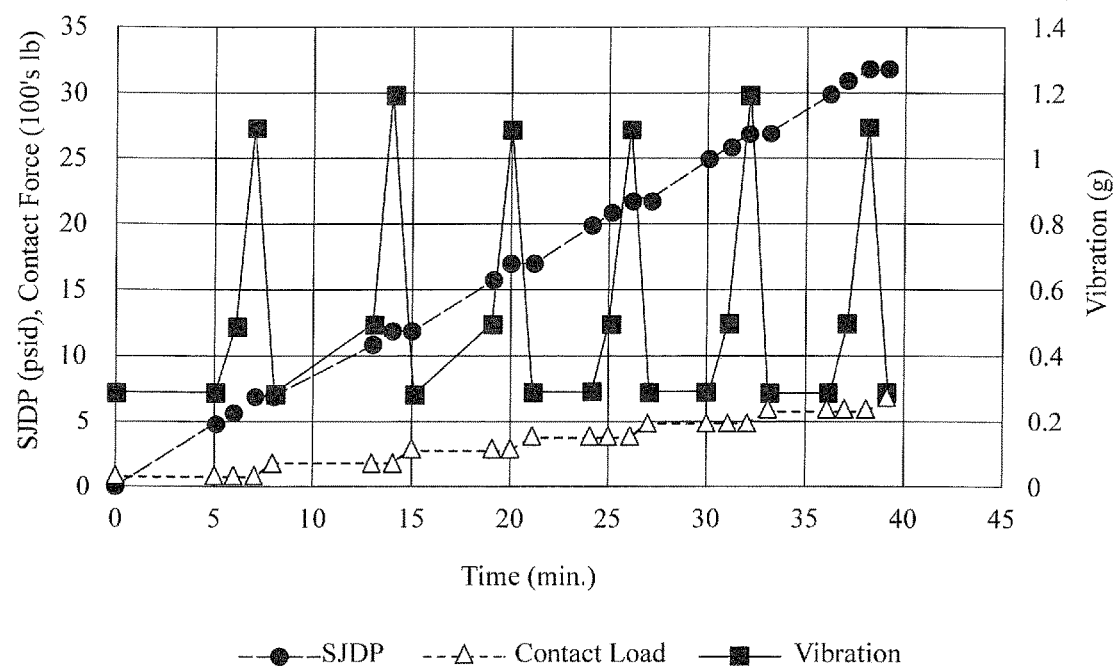
FIG. 14 is a graph of theoretical test results that illustrate one technique for establishing a quantitative relationship between a flow condition at a jet pump slip joint and the mixer/diffuser transverse contact load.

In a more general aspect of the method, the tests determine a property of the flow through the slip joint from the end region of the mixer to the inlet region of the diffuser that causes FIV. In a preferred embodiment, reflected in the step S102, the tests determine a quantitative relationship between the slip joint differential pressure at which FIV begins (onset SJDP) and the transverse mixer/diffuser transverse contact load. Data collected from testing a jet pump as discussed above can be used to determine the flow conditions (onset SJDP, for example) at which FIV begins for different transverse contact loads. For this sample test example, assume that the jet pump is more susceptible to FIV for positive slip joint differential pressures. The test is set to its initial conditions (using full scale jet pumps set up prototypically, as discussed above) for fluid temperature, tank pressure, drive flow rate, starting slip joint differential pressure (or M-ratio), and initial transverse contact load between the mixer and diffuser. For simplicity in this sample test, the contact force is set to 100 pounds to start, the SJDP is assumed to be 0 psid, and it is assumed that no FIV would be observed under these conditions. FIV is defined in this example when the vibration exceeds 1 g (32.2 ft./sec.$^2$). The SJDP is slowly increased until an increase in vibration is observed by accelerometers that measure vibration, say at the slip joint. After the vibration reaches or exceeds the value associated with FIV, the transverse contact load is increased to suppress the FIV. After the FIV is suppressed the SJDP is increased until FIV is seen again. This process is repeated until the entire test range of SJDP (or transverse contact loads) is completed. The assumed results of this sample test are plotted in FIG. 14, and based thereon the following quantitative relationship between would be established between the mixer/diffuser transverse contact load and onset SJDP:

TABLE 4

| SJDP (psid) | Required transverse contact load (lbs.) |
| --- | --- |
| ≤6 | 100 |
| ≤11 | 200 |
| ≤16 | 300 |
| ≤21 | 400 |
| ≤26 | 500 |
| ≤31 | 600 |
| 32 | 700 (end of test data) |

It will be appreciated that actual data developed in this manner can be interpolated or extrapolated as required to determine the necessary mixer/diffuser transverse contact load in a reactor to which the method is applied. For example, if the highest SJDP experienced by a reactor to which these tests are to be applied is 13 psid, the minimum transverse contact load under operating conditions according to the data should be 140 lbs. (Higher transverse contact loads for operating SJDP values greater than 32 psid can be extrapolated from the test results.) In a preferred implementation, the method would assume that a higher operating transverse contact load is required to account for the fact that the tests may not predict with complete certainty the actual quantitative relationship between transverse contact load and onset SJDP.

III. Alternate Methods of Applying Cold-Condition Transverse Load on Diffuser As noted above, there are numerous ways in which a desired transverse contact load can be applied between the mixer and diffuser in accordance with the invention. Many of these are discussed as Embodiments A-E in provisional application No. 61/852,834, and the descriptions therein of these alternate ways of implementing this aspect of the methods described and claimed herein are incorporated by reference. However, they are summarized herein for convenience.

Alternate Embodiment A

As one alternative to the application of a torque to the mixer described in connection with alternate approach A discussed above, a force may be applied between the mixer and a convenient adjoining reactor structure (for example, the riser pipe, a neighboring jet pump, the shroud wall, or the RPV wall). The applied force would thereby rotate the mixer as discussed above to create the desired transverse contact load with the jet pump beam loosened, and then the jet pump beam would be retightened as discussed.

Alternate Embodiment B

Another manner of applying the desired transverse contact load between the mixer and diffuser is to displace the top of the diffuser, that is, at the slip joint, a desired distance. The diffuser can be moved by loading the top of the diffuser against the riser, a neighboring diffuser, RPV, or similar structure. With the jet pump beam removed or loosened, the mixer end region can be rotated around the axis of rotation RA shown in FIG. 9 to touch the furthest deflected portion of the diffuser at the slip joint region. With the mixer just touching, nearly touching, or loaded against the diffuser, the jet pump beam is retightened to hold the mixer in place. The diffuser is unloaded to allow the diffuser to produce a load between the mixer and diffuser.

Alternate Embodiment C

Similar to Alternate C, the diffuser can be displaced further than the final desired position, which moves the mixer along with the diffuser through the slip joint connection. The jet pump beam is tightened, and then when the diffuser is released it loads the diffuser against the mixer to produce the load between the mixer and diffuser, and deflects the mixer into the desired final position. Rotations or displacements of the mixer end region (at the slip joint) other than around the axis RA in FIG. 9 are possible to achieve a load between the mixer and diffuser that can be retained by the clamping force of the jet pump beam on the mixer transition piece interface.

Alternate Embodiment D

This alternate embodiment rotates the mixer about an axis normal to the page in FIG. 9 so that it moves the mixer end region to the left as seen in that figure. As in the other cases discussed above, this would involve removing or loosening the jet pump beam to permit the mixer to be rotated to the desired position. The diffuser motion can be obtained as described in any of the embodiments thus far described, whereby the diffuser can be deflected by the rotation of the mixer or the diffuser can be moved separately. There are many specific methods to move the mixer and diffuser that can be used in accordance with this embodiment D. With the jet pump beam loosened, the diffuser can be pulled such that it rotates the mixer in a particular direction, then the jet pump beam can be tightened and the diffuser released. The diffuser will now apply a contact load on the mixer. The mixer can be rotated such that the end of the mixer moves toward the restrainer bracket where the wedge contacts it. The movement of the mixer end region in accordance with this embodiment may open a gap between the mixer and the set screws 224 (see FIG. 5), but it is believed that this will not affect the FIV suppressing effects of the transverse contact load thus created between the mixer and diffuser at the slip joint. (Alternatively, one or more of the prior art hardware modifications discussed above meant to address restrainer bracket problems can be employed.) A modification of alternate embodiment D would rotate the mixer about the same axis, but in the opposite direction, that is, so that the mixer end region moves to the right as seen in FIG. 9.

Alternate Embodiment E

In this alternate embodiment in general involves the recognizing that there are many other axes about which the mixer can be rotated to effect the desired transverse contact load with the diffuser. As one example, the mixer can be rotated about an axis at the restrainer bracket RB (220) normal to the page in FIG. 9. As in the other alternate embodiments, the jet pump beam would be removed or loosened to permit the mixer to be rotated to the desired position, and then retightened when the mixer is in the desired position. One advantage of this type of mixer rotation is that the hydraulic forces and moments can be oriented to minimize the application of further stress on existing high stress regions or areas with existing flaws or weaknesses (for example, a crack) on the jet pump structure, while also suppressing FIV.

Alternate Embodiment F

Another way of applying a transverse contact load between the mixer and diffuser is to apply a permanent side load directly on the diffuser. For example, the diffuser can be clamped to the other diffuser in a given jet pump assembly (see FIG. 2) or one or both diffusers could be pulled toward the riser or pushed away from the riser. This could be effected using a clamping device to grasp and hold structure on the diffuser(s) such as one of the guide ears 84. In one embodiment the device would include a ratcheting mechanism to apply and maintain a load on the diffuser(s). The side load could also be applied between the diffusers of neighboring jet pump assemblies rather than companion jet pumps of the same assembly. One advantage of directly displacing the diffuser is that it will permit the mixer to be removed without the necessity of removing prior art hardware meant to suppress FIV. For example, experience has shown that it is difficult and expensive to remove items such as the slip joint clamp described in U.S. Pat. No. 6,394,765. Such slip joint clamps do not fit through the restrainer bracket and must be removed to remove a mixer. The clamps often get jammed and may be damaged or damage the mixer upon removal.

Summary

In all of the methods described herein, the deflections of the mixer or diffuser may be measured to set the degree of rotation of the mixer. The forces or torques applied to the mixer or diffuser may be measured to set the mixer position. The mixer or diffuser may be moved by mechanical means, hydraulic means, pneumatic means or other means to achieve the desired final position of the mixer and transverse contact load between the mixer and the diffuser. Finite element analysis, or similar analysis, may also be employed to determine how much (and in what direction) to move the mixer or diffuser to achieve the desired final position and load between the mixer and diffuser, and to ensure that the resulting stresses on the various reactor and jet pump parts are within required limits. Forces, moments, and displacements may also be obtained from testing prototype jet pumps at full scale or other scales.

IV. Further Modification and Embodiments

One of the embodiments discussed above uses the tool 400 to measure the mixer/diffuser transverse contact load magnitude and direction by applying a force between the mixer and diffuser. However, provisional application No. 61/853,608, which is incorporated herein by reference, describes alternate techniques by which a force can be applied to the diffuser only from the RPV and core shroud (or from the riser). This is described in detail in the text of the provisional application at pages 4-7 and in connection with FIGS. 3 and 4, all of which description, and the accompanying figures, are incorporated herein by reference. For convenience, salient aspects of that description are included here. The described technique proceeds from the realization that when the mixer and diffuser are in contact the stiffness of the combined structure is greater than either individual component. For purposes of illustrating a basic concept involved in this technique, a one-dimensional model of the slip joint is used. The diffuser force/displacement curve changes depending on the direction and the magnitude of the contact load between the mixer and diffuser, and on the direction the force or displacement is applied. FIG. 3 of the provisional application is an idealized plot of the force versus displacement. If there is no applied force and the reference deflection is taken as zero, then the force deflection plot follows the slope shown in section A of FIG. 3 when the mixer and diffuser are in contact. If the diffuser is deflected in the direction of the arrow in the sketch labeled A, eventually, the diffuser and mixer separate and the slope changes as shown by section B (and the sketch labeled B). The point where the slope change occurs indicates the force and deflection required to separate the diffuser and mixer. The slope in section B indicates the smaller spring constant associated with just deflecting the diffuser. The length of section B along the deflection axis indicates the slip joint gap where the mixer is located within the diffuser; it may not be equal to the diametric clearance. Section C of the plot shows a slope increase that occurs when the mixer is again in contact with the diffuser (the sketch labeled C). Since the initial position of the mixer and diffuser is unknown, one may actually start anywhere on this plot. Therefore, it may be necessary to apply a positive and/or negative force to find the point at which the mixer and diffuser separate. Note that this idealized plot assumes the force is applied radially from the point of contact and ignores frictional effects in the slip joint.

For that reason, the plot in FIG. 3 may not be realized unless the force or displacement is applied in a direction close to radially toward the point of contact (the one-dimensional case discussed above); that is, the mixer and diffuser may not separate from each other depending on the direction of the applied force relative to the contact load. FIG. 4 of the provisional application illustrates the effect of transverse contact load magnitude on the direction of the applied force required to separate the mixer and diffuser. This figure illustrates why it is not required to separate the mixer and diffuser to determine the direction and magnitude of the cold-condition transverse contact load. By measuring (or knowing) the direction of the applied force and the motion of the diffuser in at least two directions, the location of the point of contact (or the centers of the mixer and diffuser) can be determined. This occurs because the diffuser moves around the circular mixer, and the deflection of the mixer and its effect on the motion can be accounted for from measurement or models. Furthermore, if the friction coefficient between the mixer and diffuser is known (or determined), then the magnitude of the transverse contact load can be determined (knowing or determining the spring constant of the mixer and diffuser when deflected together) without separating the mixer and diffuser. Alternatively, if the point of contact is determined, then the force can be applied in the corresponding direction to determine the transverse contact load.

The above discussion assumes that the deflection force is applied to the diffuser, but the principles expressed apply equally if it is applied to the mixer. A load or deflection can be applied to the diffuser or the mixer. The load or deflection that is applied can be measured or a known load or deflection can be applied and the corresponding response measured. Loads can be forces or moments and displacements can be linear or rotational. At a minimum the force and displacement must be applied in at least one direction, and the displacement or force must be measured in at least one direction. Other information can be obtained from models of the jet pump (for example, by FEM analysis) or from knowledge of how the force or displacement is being applied. As discussed above, it is sufficient to show that the magnitude of the contact load is equal to or exceeds the value required to suppress FIV without determining the magnitude of the contact load or the point of contact.

Provisional application No. 61/853,608 describes yet another alternate technique by which the cold-condition contact load can be determined other than by using the tool 400 described above. This alternate technique is described in detail in the text of the provisional application in the paragraph spanning pages 7 and 8, all of which description is incorporated herein by reference. For convenience, salient aspects of that discussion are included here. This alternative technique applies an impulsive load to the diffuser or mixer (for example, a hammer test or pluck test) and measures the response of the mixer and or diffuser to the impulsive load. The response can be acceleration, displacement, or velocity. If the mixer and diffuser are not in contact, the frequency of the responsive ring from the separated mixer and diffuser will be different from the frequency if there is a transverse contact load between the mixer and diffuser. The coupled response will act primarily as a single structure until the magnitude of the impulse is sufficiently large to overcome the contact force between the mixer and diffuser. When this occurs high harmonics will be developed from the mixer/diffuser impact, and the appearance of these impacts will identify the impulse required to separate the mixer and diffuser. The amplitude of the force or motion required to get slippage provides an estimate of the friction force as does the damping of the motion of the structure in this case (the friction force is essentially the contact force multiplied by the friction coefficient). Knowing, estimating, or measuring the friction coefficient combined with the estimated friction force provides a prediction of the contact load. If the impulsive load is applied in the radial direction of the contact load point and it is of sufficient magnitude, then there will be motion that is large enough to cause separation between the mixer and diffuser and banging between the components, which can be used to determine the contact load. Applying loads in different directions allows the location of the contact point to be determined.

V. Summary and Conclusion

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A method of suppressing flow-induced vibration (FIV) in a jet pump for recirculating water in a nuclear reactor, the jet pump including a mixer for accepting recirculated water and a diffuser for accepting the water from the mixer, wherein an end region of the mixer fits within an inlet region of the diffuser at a slip joint with a radial clearance between the mixer and the diffuser, the method comprising:
   determining a first quantitative relationship correlating (i) a transverse contact load between the mixer and diffuser at the slip joint under reactor operating conditions and (ii) a property of the flow through the jet pump related to the onset of FIV;
   determining a second quantitative relationship between (i) a cold transverse contact load between the mixer and diffuser at the slip joint when the reactor is not operating, and (ii) an operating transverse contact load between the mixer and diffuser at the slip joint under reactor operating conditions; and
   positioning the mixer and diffuser relative to each other when the reactor is not operating based on the second quantitative relationship so as to provide a predetermined cold transverse contact load at the slip joint that will result in an operating transverse contact load at least as large as that correlated to the property of the flow through the jet pump at the onset of FIV as indicated by the first quantitative relationship at a particular reactor operating condition.

2. A method as in claim 1, wherein the property of the flow through the jet pump is the slip joint differential pressure (SJDP), which is the difference between the fluid pressure inside an operating jet pump proximate to the end region of the mixer and the fluid pressure outside the operating jet pump, at which FIV begins (onset SJDP).

3. A method as in claim 1, wherein the first quantitative relationship is determined empirically by performing tests on a full-scale operational mock-up of a jet pump.

4. A method as in claim 1, wherein the second quantitative relationship is determined by mathematically modeling a jet pump installed in a reactor.

5. A method as in claim 4, wherein the second quantitative relationship is determined by using a finite element method to model structural aspects of the reactor, including the installed jet pump, and computational fluid dynamics to model fluid dynamic effects of the flow of water through the reactor and the jet pump.

6. A method as in claim 1, wherein the diffuser resists deflection in the radial direction with a known force per unit distance of deflection, and the positioning step includes moving the mixer end region when the reactor is not operating a predetermined distance to deflect the inlet region of the diffuser a distance that provides the predetermined cold transverse contact load at the slip joint.

7. A method as in claim 6, wherein the force per unit distance of deflection of the diffuser is determined by at least one of the following methods: (i) empirically by performing tests on a full-scale operational mock-up of a jet pump, (ii) empirically by performing tests on a sub-scale operational mock-up of a jet pump, (iii) a finite element method, and (vi) mathematically modeling components of the reactor, including the jet pump.

8. A method as in claim 1, wherein the mixer is rotatably mounted proximate to an upper inlet region of the mixer at a transition piece and has a lower outlet region disposed within an upper inlet region of the diffuser for relative movement of the mixer and diffuser, and a restrainer bracket supports the mixer between the upper inlet region and lower outlet region thereof such that movement of the upper inlet region of the mixer relative to the transition piece displaces the lower outlet region about a fulcrum provided by the restrainer bracket, the method further comprising:
   providing a mixer adjustment apparatus including a support frame having at least one anchoring member mounted for movement relative to the support frame and an actuating member mounted on the support frame for movement of the actuating member relative to the support frame, wherein the actuating member is disposed for contacting the mixer upper inlet region when the apparatus is held in place by an anchoring member;
   bringing the anchoring member into contact with the reactor to hold the apparatus in place proximate to the mixer upper inlet region; and
   positioning the mixer relative to the diffuser by using the actuating member to apply a force to the mixer upper inlet region to displace the mixer relative to the transition piece when the apparatus is held in place by the anchoring member.

9. A method as in claim 8, wherein:
   the support frame comprises a cylindrical support shell; and
   the anchoring member includes at least one anchoring rod mounted within the support shell for reciprocating movement for retracting into the support shell to enable the apparatus to be manipulated into place within an annular space between a reactor core shroud and a reactor pressure vessel wall proximate to the upper inlet region of the mixer and for extending out of the support shell into contact with the core shroud and the pressure vessel wall to hold the apparatus in place relative to the reactor.

10. A method as in claim 9, wherein the actuating member is mounted for reciprocating sliding movement on the support shell and comprises capturing members disposed for fitting against opposing sides of a lifting eye at the upper inlet region of the mixer.

11. A method as in claim 1, wherein:
   the jet pump further includes a nozzle section for introducing recirculated water into an inlet of the mixer, the nozzle section being mounted relative to the mixer inlet for entraining water in a nuclear reactor pressure vessel into the recirculated water introduced into the mixer inlet; and
   the property of the flow through the jet pump is a ratio derived from the mass flow of the recirculated water introduced into the inlet of the mixer and the mass flow of the water entrained into the recirculated water.

12. A method as in claim 9, wherein the mixer adjustment apparatus further includes a measuring device comprising a linear variable differential transformer (LVDT) for outputting an electrical signal indicative of the amount of movement of an LVDT actuating rod relative to an LVDT housing, wherein the LVDT housing and LVDT actuating rod are operatively connected between the reactor and the mixer for measuring the distance traveled by the mixer relative to the reactor.

13. A method as in claim 1, wherein the mixer is rotatably mounted proximate to an upper inlet region of the mixer at a transition piece and having a lower outlet region disposed within an upper inlet region of the diffuser for relative movement of the mixer and diffuser, the mixer is supported at a restrainer bracket between the mixer upper inlet region and lower outlet region such that movement of the upper inlet region of the mixer relative to the transition piece displaces the lower outlet region about a fulcrum provided by the restrainer bracket, and the mixer upper inlet region is fixed in place relative to the transition piece by a jet pump beam, the method further comprising:
- loosening the jet pump beam to permit movement of the mixer upper inlet region relative to the transaction piece;
- thereafter positioning the mixer and diffuser relative to each other by moving the mixer upper inlet region relative to the transition piece to displace the mixer lower outlet region a predetermined amount;
- measuring the distance traveled by the mixer; and
- retightening the jet pump beam after moving the mixer.

14. A method as in claim 13, wherein the measuring step is performed before the retightening step.

15. A method as in claim 13, wherein the measuring step measures the distance traveled by the mixer upper inlet region.

16. A method as in claim 1, wherein the first quantitative relationship is determined empirically by performing tests on a sub-scale operational mock-up of a jet pump.

17. A method as in claim 1, wherein the first quantitative relationship is determined numerically by performing computational fluid dynamics calculations to model fluid dynamic effects of the flow of water proximate to the slip joint.

18. A method as in claim 1, wherein the first quantitative relationship is determined analytically by modeling the fluid dynamic effects of the flow of water proximate to the slip joint.

\* \* \* \* \*